(12) United States Patent
Gupta et al.

(10) Patent No.: US 10,755,172 B2
(45) Date of Patent: Aug. 25, 2020

(54) SECURE TRAINING OF MULTI-PARTY DEEP NEURAL NETWORK

(71) Applicant: Massachusetts Institute of Technology, Cambridge, MA (US)

(72) Inventors: Otkrist Gupta, Cambridge, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 707 days.

(21) Appl. No.: 15/630,944

(22) Filed: Jun. 22, 2017

(65) Prior Publication Data

US 2017/0372201 A1    Dec. 28, 2017

Related U.S. Application Data

(60) Provisional application No. 62/353,040, filed on Jun. 22, 2016.

(51) Int. Cl.
*G06N 3/08* (2006.01)
*G06N 3/04* (2006.01)
*G06N 20/00* (2019.01)

(52) U.S. Cl.
CPC ............ *G06N 3/08* (2013.01); *G06N 3/0454* (2013.01); *G06N 3/084* (2013.01); *G06N 20/00* (2019.01)

(58) Field of Classification Search
None
See application file for complete search history.

(56) References Cited

U.S. PATENT DOCUMENTS

| 8,250,013 | B2 | 8/2012 | Fung et al. |
| 8,966,648 | B2 | 2/2015 | Aggarwal et al. |
| 2016/0020904 | A1 | 1/2016 | Ioannidis et al. |
| 2016/0379639 | A1 | 12/2016 | Weinstein et al. |

OTHER PUBLICATIONS

Dean, Jeffrey, Greg Corrado, Rajat Monga, Kai Chen, Matthieu Devin, Mark Mao, Marc'aurelio Ranzato et al. "Large scale distributed deep networks." In Advances in neural information processing systems, pp. 1223-1231. 2012. (Year: 2012).*

(Continued)

*Primary Examiner* — Alexey Shmatov
*Assistant Examiner* — Casey R. Garner
(74) *Attorney, Agent, or Firm* — Stephen R. Otis

(57) ABSTRACT

A deep neural network may be trained on the data of one or more entities, also know as Alices. An outside computing entity, also known as a Bob, may assist in these computations, without receiving access to Alices' data. Data privacy may be preserved by employing a "split" neural network. The network may comprise an Alice part and a Bob part. The Alice part may comprise at least three neural layers, and the Bob part may comprise at least two neural layers. When training on data of an Alice, that Alice may input her data into the Alice part, perform forward propagation though the Alice part, and then pass output activations for the final layer of the Alice part to Bob. Bob may then forward propagate through the Bob part. Similarly, backpropagation may proceed backwards through the Bob part, and then through the Alice part of the network.

20 Claims, 11 Drawing Sheets

(56) References Cited

OTHER PUBLICATIONS

Shokri, Reza, and Vitaly Shmatikov. "Privacy-preserving deep learning." In Proceedings of the 22nd ACM SIGSAC conference on computer and communications security, pp. 1310-1321. 2015. (Year: 2015).*

Smaragdis, Paris, and Madhusudana Shashanka. "A framework for secure speech recognition." IEEE Transactions on Audio, Speech, and Language Processing 15, No. 4 (2007): 1404-1413. (Year: 2007).*

Avidan, S., et al., Blind vision; published in ECCV'06 Proceedings of the 9th European conference on Computer Vision, vol. Part III, pp. 1-13, May 2006.

Bansal, A., et al., Privacy preserving Back-propagation neural network learning over arbitrarily partitioned data; published in Neural Computing and Applications, Feb. 2011, vol. 20, Issue 1, pp. 143-150.

Barni, M., et al., Privacy-Preserving ECG Classification With Branching Programs and Neural Networks; published in IEEE Transactions on Information Forensics and Security, vol. 6, Issue 2, 2011, pp. 452-468, Jan. 2011.

Barni, M., et al., A privacy-preserving protocol for neural-network-based computation; published in MM&Sec '06 Proceedings of the 8th workshop on Multimedia and Security, pp. 146-151, Sep. 2006.

Chang, Y., et al., Oblivious polynomial evaluation and oblivious neural learning; published in Theoretical Computer Science, vol. 341 Issue 1, Sep. 2005, pp. 39-54.

Chen, T., et al., Privacy-Preserving Backpropagation Neural Network Learning; published in IEEE Transactions on Neural Networks, vol. 20, Issue 10, pp. 1554-1564, Aug. 2009.

Chen, K., et al., A Random Rotation Perturbation Approach to Privacy Preserving Data Classification; published in 2005 by Kno.e.sis Publications; accessed Jul. 18, 2017 at http://corescholar.libraries.wright.edu/cgi/viewcontent.cgi?article=22928,context=knoesis.

Dosovitskiy, A., et al., Inverting Visual Representations with Convolutional Networks; published in arXiv:1506.02753v4 [cs.NE] Apr. 26, 2016.

Dowlin, N., et al., CryptoNets: Applying Neural Networks to Encrypted Data with High Throughput and Accuracy; Published as TechReport, MSR-TR-2016-3, Publisher Microsoft Research, Feb. 8, 2016.

Goldreich, o., et al., How to Play Any Mental Game; published in STOC '87 Proceedings of the nineteenth annual ACM Symposium on Theory of Computing, pp. 218-229, ACM New York, NY, USA, 1987.

Guang, L, et al., A Privacy Preserving Neural Network Learning Algorithm for Horizontally Partitioned Databases; published in Information Technology Journal, Year 2010, vol. 9, Issue 1, pp. 1-10.

Jain, L., et al., Preserving Security in Routing in Mobile Ad-hoc Environment through Non-Linear Dimension Reduction Techniques; published in International Journal of Advanced Research in Computer Science, vol. 2, No. 6, pp. 508-513, Year 2011.

Kumar, P., et al., Privacy Preserving Back-Propagation Neural Network in Cloud Computing; published in International Journal of Advanced Research in Computer Engineering & Technology (IJARCET), vol. 3, Issue 6, pp. 2086-2092, Jun. 2014.

Lian, S., et al., Secure hash function based on neural network; published in Neurocomputing, vol. 69, Issues 16-18, Oct. 2006, pp. 2346-2350.

Orlandi, C., et al., Oblivious neural network computing via homomorphic encryption; published in EURASIP Journal on Information Security, vol. 2007, Jan. 2007, Article No. 18.

Pathak, D., et al., Context Encoders: Feature Learning by Inpainting; published in arXiv:1604.07379v1 [cs.CV] Apr. 25, 2016.

Schlitter, N., A Protocol for Privacy Preserving Neural Network Learning on Horizontally Partitioned Data; published as Conference Paper, Year of Publication 2008, Conference Name Privacy Statistics in Databases (PSD) 2008; accessed on Jul. 19, 2017 at http://citeseerxist.psu.edu/viewdoc/download?doi=10.1.1.458.8451&rep=rep1&type=pdf.

Secretan, J., et al., A Privacy Preserving Probabilistic Neural Network for Horizontally Partitioned Databases; published in International Joint Conference on Neural Networks, 2007, IJCNN 2007.

Shihab, K., A Backpropagation Neural Network for Computer Network Security; published in Journal of Computer Science, vol. 2, Issue 9, pp. 710-715, Year 2006.

Shokri, R., et al., Privacy-Preserving Deep Learning; published in CCS '15 Proceedings of the 22nd ACM SIGSAC Conference on Computer and Communications Security, pp. 1310-1321, Year 2015.

Vincent, P., et al., Stacked Denoising Autoencoders: Learning Useful Representations in a Deep Network with a Local Denoising Criterion; published in The Journal of Machine Learning Research, vol. 11, pp. 3371-3408, Year 2010.

Weston, J., et al., Deep Learning via Semi-Supervised Embedding; published in ICML '08 Proceedings of the 25th International conference on Machine learning , pp. 1168-1175, year 2008.

Yao, A., How to generate and exchange secrets; published in SFCS '86 Proceedings of the 27th Annual Symposium on Foundations of Computer Science, pp. 162-167, Year 1986.

Yuan, J., et al., Privacy Preserving Back-Propagation Neural Network Learning Made Practical with Cloud Computing; published in IEEE Transactions on Parallel and Distributed Systems, vol. 25, Issue 1, Jan. 2014, pp. 212-221.

Zhang, Y., et al., A privacy-preserving algorithm for distributed training of neural network ensembles; published in Neural Computing and Applications, May 2013, vol. 22, Supplement 1, pp. 269-282.

* cited by examiner

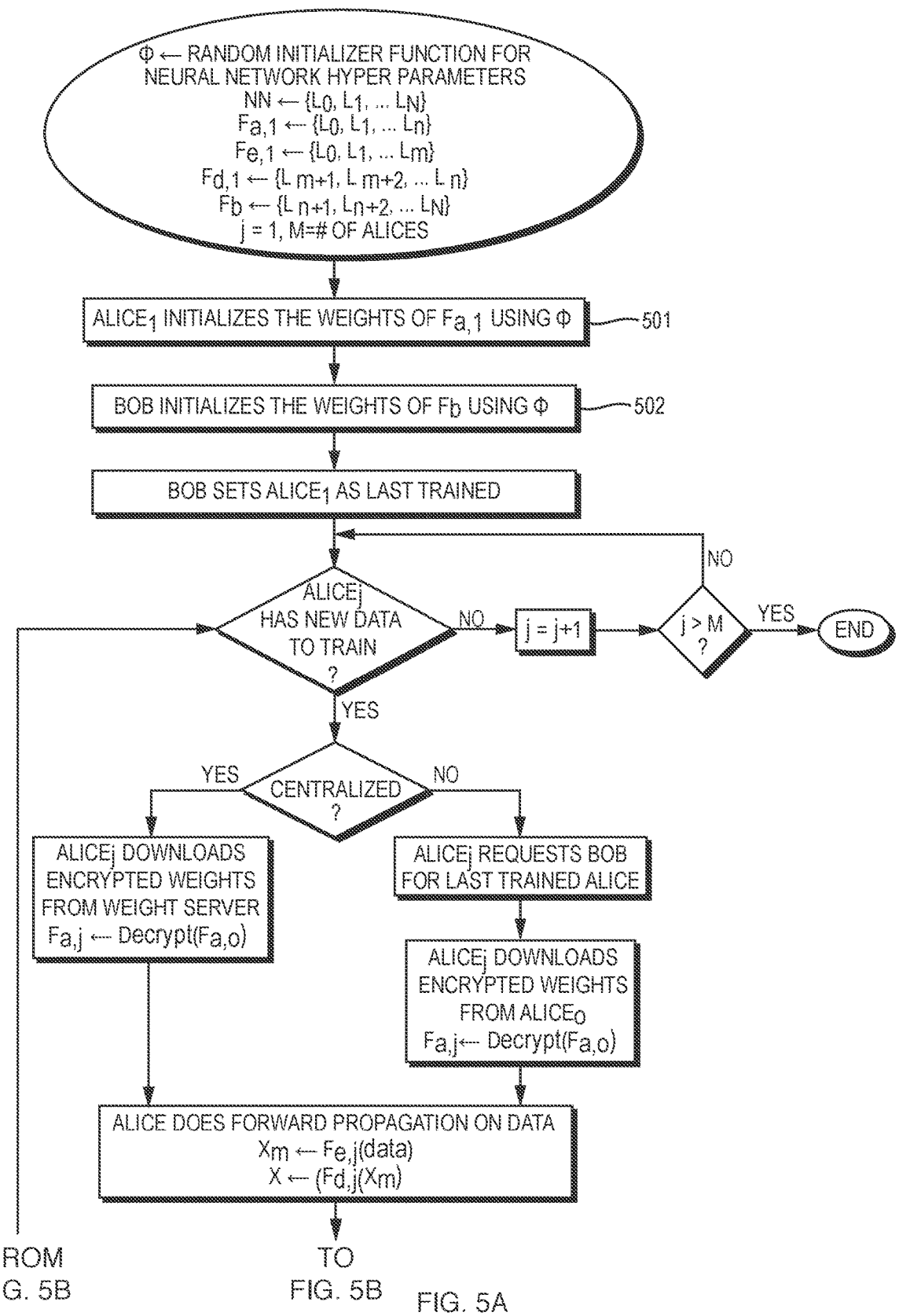

SECURE TRAINING OF MULTI-PARTY DEEP NEURAL NETWORK

RELATED APPLICATIONS

This application claims the benefit of U.S. Provisional Application No. 62/353,040, filed Jun. 22, 2016 (the "Provisional Application"), the entire disclosure of which is herein incorporated by reference.

FIELD OF TECHNOLOGY

The present invention relates generally to neural networks.

COMPUTER PROGRAM LISTING

The following eighteen computer program files are incorporated by reference herein: (1) alice.txt with a size of about 7 KB, created Feb. 8, 2017; (2) alice_weight_server.txt with a size of about 2 KB, created Feb. 8, 2017; (3) bob_server.txt with a size of about 6 KB, created Feb. 8, 2017; (4) bob_weight_server.txt with a size of about 4 KB, created Feb. 8, 2017; (5) conn_utils.txt with a size of about 7 KB, created Feb. 8, 2017; (6) encryption_utils.txt with a size of about 4 KB, created Feb. 8, 2017; (7) md5sum.txt with a size of about 1 KB, created Feb. 8, 2017; (8) pylayr.txt with a size of about 4 KB, created Feb. 8, 2017; (9) rpc_config.txt with a size of about 8 KB, created Feb. 8, 2017; (10) run_solver.txt with a size of about 4 KB, created Feb. 8, 2017; (11) alice_C2.txt with a size of about 4 KB, created Jun. 7, 2017; (12) alice_solver_C1.txt with a size of about 1 KB, created Jun. 12, 2017; (13) alice_solver_C2.txt with a size of about 1 KB, created Jun. 7, 2017; (14) alice_train_test_C1.txt with a size of about 2 KB, created Jun. 12, 2017; (15) bob_C2.txt with a size of about 2 KB, created Jun. 7, 2017; (16) bob_solver_C1.txt with a size of about 1 KB, created Jun. 12, 2017; (17) bob_solver_C2.txt with a size of about 1 KB, created Jun. 7, 2017; and (18) bob_train_test_C1.txt with a size of about 2 KB, created Jun. 7, 2017.

SUMMARY

In many situations, it is desirable to train a deep neural network with data of one or more parties who need to keep their data private from each other, and from an outside computing resource that is performing the training. For example, in many situations: (a) a computing resource ("Bob") has a deep neural network ("DNN"); (b) one or more data entities (each, an "Alice") have data, which the parties want to use to train the DNN; (c) each Alice wants to ensure that its data is not shared with Bob and is not shared with any of the other Alices; and (b) Bob wants to ensure that certain hyperparameters of the DNN and a portion of the topology of the DNN are not shared with any of the Alices.

This creates a technical challenge: how can Bob train a DNN on data of many Alices—without Bob seeing their data? And without the Alices discovering key information about the DNN, which may be a proprietary network that Bob has created?

Specifically, the following technological problem arises: how to securely train a multi-party DNN. As used herein, to "securely train a multi-party DNN" means to train a DNN on the data of one or more Alices in such a manner that: (1) the DNN is performed at least in part by Bob; (2) the data of each Alice is not shared with Bob and is not shared with any of the other Alices; and (3) certain hyperparameters of the DNN and a portion of the topology of the DNN are set by Bob and are not shared with any of the Alices.

A variety of conventional solutions to this technological problem exist. For example, conventional methods of securely training a multi-party DNN may have one or more of the following features: (1) homomorphic encryption (in which Alice's data is homomorphically encrypted before being sent to Bob and remains homomorphically encrypted while Bob trains the DNN); (2) random perturbation of data, such as by the addition of random noise to Alice's data; (3) sharing only shallow representations of Alice's data, such as HOG (histogram of oriented gradients) or SIFT (scale invariant feature transform) representations; (4) oblivious transfer; (5) secure dot product operations; (6) secure one way hash computations; (7) transfer of random shares of data, (8) using Ada-boost to jointly train classifier ensembles; or (9) a general-purpose multi-party cryptographic protocol (such as taught by A. Yao, "How to Generate and Exchange Secrets", 27th Annual Symposium on Foundations of Computer Science, pages 162-167, 1986).

Unfortunately, these conventional methods (of securely training a multi-party DNN) suffer from drawbacks. A major drawback is that these conventional methods are so computationally inefficient that they are not well-suited for practical applications. Also, some of these conventional methods create the risk that Bob may reconstruct Alice's data. For example, SIFT and HOG feature vectors can be inverted accurately using prior knowledge of methods used to create the vectors, which would allow Bob to accurately reconstruct Alice's data. Also, for example, neural networks may be robust to random noise, such that data intentionally perturbed by random noise may be accurately reconstructed.

In illustrative implementations, this invention represents a technological improvement over these conventional methods: In illustrative implementations of this invention, a multi-party DNN is securely trained in a manner that avoids each of the above drawbacks. The training method of the present invention is much more computationally efficient than any conventional method. Furthermore, the training method of the present invention may ensure that Bob cannot, in practice, reconstruct Alice's data.

In illustrative implementations of this invention, a multi-party DNN comprises two parts. Hence, loosely speaking, in illustrative implementations, the multi-party DNN comprises a "split" neural network. For each given Alice, Alice performs part of the DNN (the "Alice part") and Bob performs another part of the DNN (the "Bob part"). The Alice part of the DNN comprises at least three layers of the DNN and includes a hidden layer. The Bob part of the DNN comprises two or more layers.

In illustrative implementations of this invention, training on the DNN with a given Alice may occur as follows: Alice may input her data into the Alice part of the DNN. During forward propagation, output activations for the output layer of the Alice part of the DNN may be encrypted (e.g., by RSA encryption), then sent to Bob in encrypted form, then decrypted by Bob (e.g., to invert the RSA encryption), and then treated as inputs to the input layer of Bob's part of the DNN. During backpropagation, gradients for the input layer of Bob's part of the DNN may be encrypted (e.g., by RSA encryption), then sent to Alice in encrypted form, then decrypted by Alice (e.g., to invert the RSA encryption), and the decrypted gradients may be treated as the gradients for the output layer of the Alice part of the DNN network. As defined herein, an "input" layer means a layer that is an initial input layer (of the Alice part of the DNN or of the Bob part of the DNN) during forward propagation, and an "output" layer means a layer that is a final output layer (of the Alice part of the DNN or of the Bob part of the DNN) during forward propagation. For example, in Algorithms 1 and 2: (a) the input layer and output layer of the Alice part are layer $L_0$ and layer $L_n$, respectively; and (b) the input layer and output layer of the Bob part are layer $L_{n+1}$ and layer $L_N$, respectively.

To analyze the computational efficiency of the present invention, it helps to compare the present invention to a base scenario. Consider a base scenario, in which a single party trains a DNN using a single computer. Let us analyze what extra computational steps occur in the present invention, as compared to the base scenario. In illustrative implementations of this invention, the extra computational steps occur primarily during the above-mentioned encryption and decryption, specifically: (a) during forward propagation, when output activations for Alice's output layer are encrypted by Alice, sent to Bob and then decrypted by Bob; and (b) during backpropagation, when gradients for Bob's input layer are encrypted by Bob, sent to Alice and then decrypted by Alice. In illustrative implementations, this encryption/decryption of output activations and losses comprises the large majority of the extra computational steps. In illustrative implementations, there are also other additional steps that account for a relatively small portion of the extra computational load, as compared to the base scenario (such as (a) when Bob instructs Alice regarding the topology of Alice's part of the DNN during initial set-up, or (b) when weights and biases computed by the last trained Alice are encrypted for direct or indirect transfer to the current Alice and then decrypted by the current Alice.)

In illustrative implementations, the present invention is much more computationally efficient than conventional methods of securely training a multi-party DNN. Indeed, the present invention is so computationally efficient that it is well-suited for practical applications (unlike conventional methods, which are too slow for practical real-world use). The encryption/decryption involved in the present invention adds an extra computational load, but the extra load is, advantageously, relatively small.

In illustrative implementations, the DNN may be trained on data from one or more Alices.

If the DNN is trained on data from multiple Alices, the DNN may operate in either centralized mode or peer-to-peer mode. In peer-to-peer mode: (a) Bob sends to the current Alice information (such as an IP address) that identifies the last trained Alice; and (b) the current Alice uses this information to connect with the last trained Alice over the internet, and then downloads, from the last trained Alice, encrypted weights and biases for the nodes in the Alice part of the DNN. In centralized mode: (a) the last trained Alice encrypts (e.g. by RSA encryption) weights and biases for the nodes in the Alice part of the DNN, and then uploads them to a weight server; and (b) then the current Alice downloads these encrypted weights and biases from the weight server, decrypts them (e.g., by inverting the RSA encryption), and treats them as initial weights and biases for the nodes in the Alice part of the DNN. In centralized mode, the weight server (to which weights and biases are uploaded, and from which they are downloaded) may be operated by Bob, by an Alice, or a by a mutually trusted third party.

Alternatively, in both peer-to-peer mode and centralized mode: (a) the first Alice may randomly initialize the weights and biases with a random seed, and transmit this seed to the other Alices; and (b) then later, rather than the last trained Alice providing encrypted actual weights and encrypted actual biases, the last trained Alice may instead provide encrypted weight updates and encrypted bias updates. This alternative approach (weight/bias updates, instead of actual weights/biases) provides more security against a man-in-the-middle attack. The encrypted weight/bias updates may: (i) in peer-to-peer mode, be sent directly from the last trained Alice to the current Alice or (ii) in centralized mode, be uploaded to a weight server by the last trained Alice and then downloaded from the weight server by the current Alice.

In some implementations, semi-supervised learning occurs. For example, in semi-supervised learning implementations of this invention: (a) the layers in Alice's part of the DNN may include encoder layers and decoder layers; (b) Bob's part of the DNN may compute the classifier loss; and (c) Alice may combine losses from the decoder layers with gradients received from Bob, and use them to perform backpropagation.

In some implementations, an ensemble of DNNs are trained. In some implementations: (a) Bob and Alice may train an ensemble of multiple DNNs on Alice's data; (b) each of the DNNs in the ensemble may have a different topology; and (c) during testing mode, each DNN may compute a classification, and the classification which has the largest number of "votes" (i.e., the classification computed by the largest number of DNNs in the ensemble) may be treated as the classification outputted by the ensemble. For example, if, an ensemble consists of five DNNs each with a different topology, and if during test mode, four DNNs in the ensemble classify an object as a bird and the fifth DNN classifies the object as an airplane, then a computer may calculate that the bird classification received the most "votes", and, based on these "votes", may classify the object as a bird. Alternatively, during test mode, a computer may weight the "votes" by the DNNS in the ensemble differently for different DNNs, when calculating the classification that that has the largest number of "votes.

In some implementations, an approach that is loosely analogous to Tor may be employed, in which the identities of Alice and Bob are confidential. In some implementations, in which a Tor-like network is employed: (a) the DNN may be implemented by Alice, Bob, and multiple intermediate entities (each, an "Eve"); (b) each of the intermediate entities may perform computations for three or more layers of the DNN; (c) Alice's data is not shared with any of the intermediate entities or Bob; (d) the identity of Alice is keep confidential from Bob and from at least some of the intermediate entities; and (e) the identity of Bob is keep confidential from Alice and from at least some of the intermediate entities. In many cases, in these Tor-like implementations, the intermediate entities do not have access to the raw data that is used to train the DNN.

In some implementations, a student-teacher method may be employed to train a secondary (student) DNN using outputs from a primary (teacher) DNN. For example, in some cases: (a) a "teacher" DNN may be trained by Bob and Alice on Alice's data, as described above; and (b) a "student" DNN may be trained by Bob and Alice on an unlabeled, publicly-available dataset, using outputs from the teacher DNN.

This invention has many practical applications, including in the fields of healthcare and finance, in which it is desirable to preserve privacy and anonymity of data. More generally, it is often desirable to train deep neural networks on very large datasets, comprising data from many entities (Alices). In illustrative implementations, this invention: (a) is so computationally efficient that it enables practical, real-world training of a DNN while preserving the privacy of the data of each Alice; and (b) is thus unlike conventional methods while are too computationally inefficient for practical, real-world training.

The Summary and Abstract sections hereof: (a) do not limit this invention; (b) are intended only to give a general introduction to some illustrative implementations of this invention; (c) do not describe all the details of this invention; and (d) merely describe non-limiting examples of this invention. This invention may be implemented in many other ways. Likewise, the description of this invention in the Field of Technology section is not limiting; instead it identifies, in a general, non-exclusive manner, a field of technology to which some implementations of this invention generally relate.

BRIEF DESCRIPTION OF THE DRAWINGS

FIG. 5A and FIG. 5B together comprise a flowchart for semi-supervised training of a DNN on data from multiple Alices.

Figure 1:
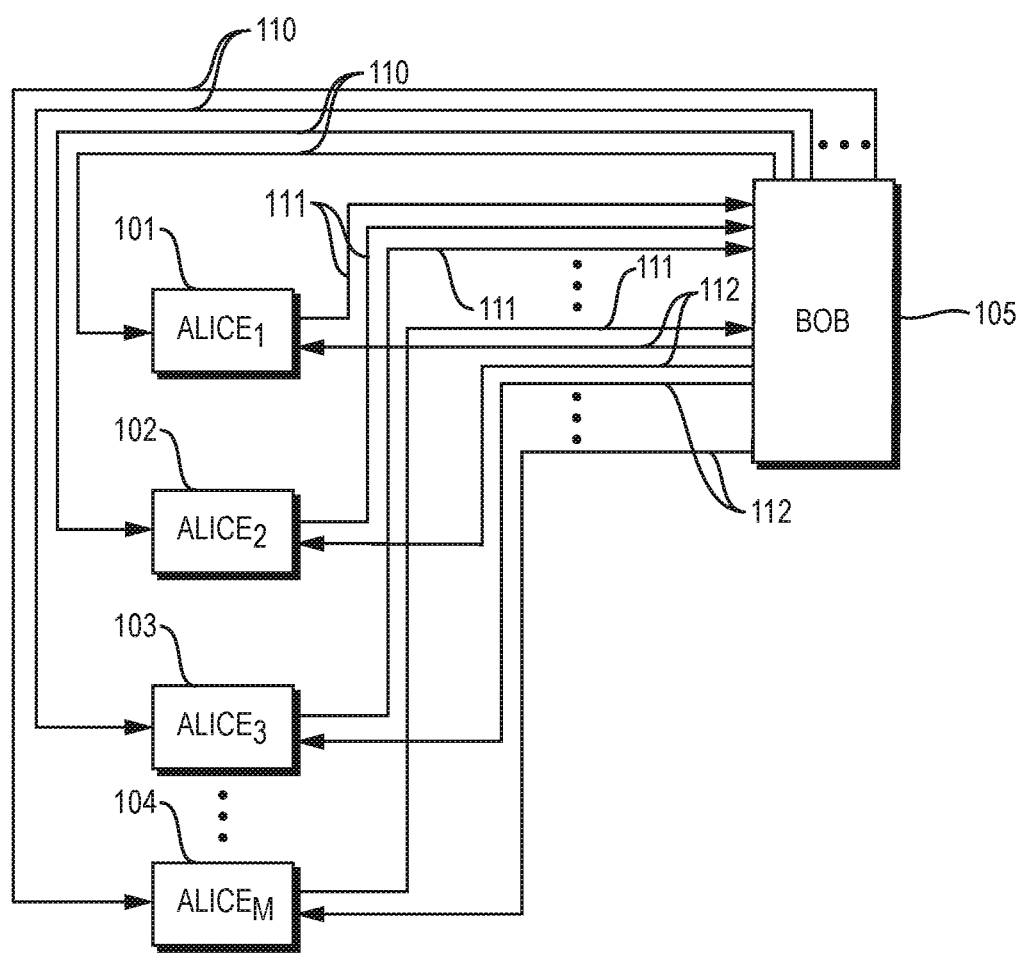
FIG. 1 is a conceptual diagram of centralized training of a deep neural network (DNN).

The above Figures show some illustrative implementations of this invention, or provide information that relates to those implementations. The examples shown in the above Figures do not limit this invention. This invention may be implemented in many other ways.

DETAILED DESCRIPTION

Overview

Training of deep neural networks may be extremely data intensive requiring preparation of large scale datasets collected from multiple entities. A deep neural network may contain millions of parameters and may require tremendous computing power for training, making it difficult for individual data repositories to train them.

Bringing in an outside supercomputing resource to train a deep neural network may be desirable, because of the tremendous computing power needed for training a deep network on a very large dataset. But, in many real-world scenarios, the entities which have the data (e.g., a medical provider or financial institution) may need to keep their data private, and may need to not share it with the outside supercomputing resource. So, there is a technological problem: how to use an outside computing resource to train a deep neural network on a dataset, without sharing the dataset with the computing resource.

As noted above, to "securely train a multi-party DNN" means to train a DNN on the data of one or more Alices in such a manner that: (1) the DNN is performed at least in part by Bob; (2) the data of each Alice is not shared with Bob and is not shared with any of the other Alices; and (3) certain hyperparameters of the DNN and a portion of the topology of the DNN are set by Bob and are not shared with any of the Alices.

There are existing, conventional approaches for securely train a multi-party DNN. But these conventional approaches are so computationally complex, and so slow, that they are not well-suited for practical applications.

In contrast, in illustrative implementations of this invention, a multi-party DNN is securely trained in a computationally efficient manner which is so fast that it may be deployed in real-world scenarios.

The present invention achieves this great computational efficiency—while still ensuring the privacy of Alice's data—by employing what may be loosely described as a "split" DNN. The DNN includes two parts: (a) a portion of the DNN that is performed by each Alice, respectively (an "Alice part"), and (b) a portion of the DNN that is performed by Bob (e.g., a supercomputing resource). In illustrative implementations of this invention, a deep neural network (DNN) is trained on a very large dataset, where different parts of the dataset are held by multiple entities (Alices). The training may be performed in part by a computing resource (Bob) and in part by the Alices. For example, Bob may be an entity that has created the DNN and that has supercomputers with computing power sufficient to train the DNN on the dataset.

In illustrative implementations of this invention, the DNN may be securely trained on a dataset comprising data of multiple Alices, as follows: While the DNN is being trained on data of a given Alice ($Alice_i$): (a) $Alice_i$ may input the data of $Alice_i$ into the Alice part of the DNN, (b) during forward propagation, $Alice_i$ may calculate forward propagation through the Alice portion of the DNN (from the input layer of the Alice part to the output layer of the Alice part), then the output activations for the output layer of the Alice part of the DNN may be sent to Bob in encrypted form, then decrypted by Bob, and then treated as inputs to the input layer of the Bob part of the DNN, and then Bob may calculate the forward propagation through Bob's part of the DNN (from the input layer of the Bob part to the output layer of the Bob part); and (c) during backpropagation, Bob may calculate backpropagation through Bob's part of the DNN (backwards from the output layer of the Bob part to the input layer of the Bob part), then losses for the input layer of Bob's part of the DNN may be sent to $Alice_i$ in encrypted form, then decrypted by $Alice_i$, then treated by $Alice_i$ as the losses for the output layer of the Alice part of the DNN, and then $Alice_i$ may calculate backpropagation through the Alice part of the DNN (backwards from the output layer of the Alice part to the input layer of the Alice part) Alice. During this process, the data of $Alice_i$ may be kept confidential, such that it is not shared with Bob and is not shared with any other Alice. In illustrative implementations: (a) Alice's portion of the DNN includes at least three layers, one of which is hidden, and (b) Bob's portion of the DNN includes two or more layers.

In many implementations, it is preferable for each layer of the DNN to include at least 256 nodes. This makes it practically impossible to invert the DNN to reconstruct Alice's data.

In some implementations of this invention, in which one or more split DNNs are trained on a dataset comprising data of multiple entities (Alices), each of the following five goals are achieved: (1) an outside computing resource (Bob) performs a large portion of the computations involved in the training; (3) each Alice keeps her data confidential, such that her data is not shared with Bob or any of the other Alices;

(3) the computing resource (Bob) retains control over the architecture of the DNN(s); (4) Bob keeps some of the parameters of the DNN(s) confidential, and does not share them with any of the Alices; and (5) after the DNN(s) are trained on the dataset of the Alices' data, the computing resource (Bob) may employ the trained DNN(s) publicly without causing any loss of privacy regarding the Alices' dataset.

In illustrative implementations of this invention, one or more DNNs are trained on a dataset that comprises data from one or more Alices, using computing resources of the Alices and of Bob, without giving Bob access to the dataset. If multiple Alices provide data, then the DNN may be trained on the data, one Alice at a time, such that the DNN is first trained on data of a first Alice, then is next trained on data of a second Alice, then is trained on data of a third Alice, and so on, until the DNN has been trained on data of all the Alices.

In illustrative implementations, the training may be performed in centralized mode or in peer-to-peer mode.

In centralized mode, the last trained Alice (i.e., the Alice on whose data the DNN has most recently been trained) uploads encrypted weights and encrypted biases to a server (the "weight server"), and the current Alice (on whose data the DNN will be trained next) downloads these encrypted weights and biases from the weight server. In peer-to-peer mode, the current Alice securely downloads encrypted weights and encrypted biases directly from the last trained Alice.

Figure 2:
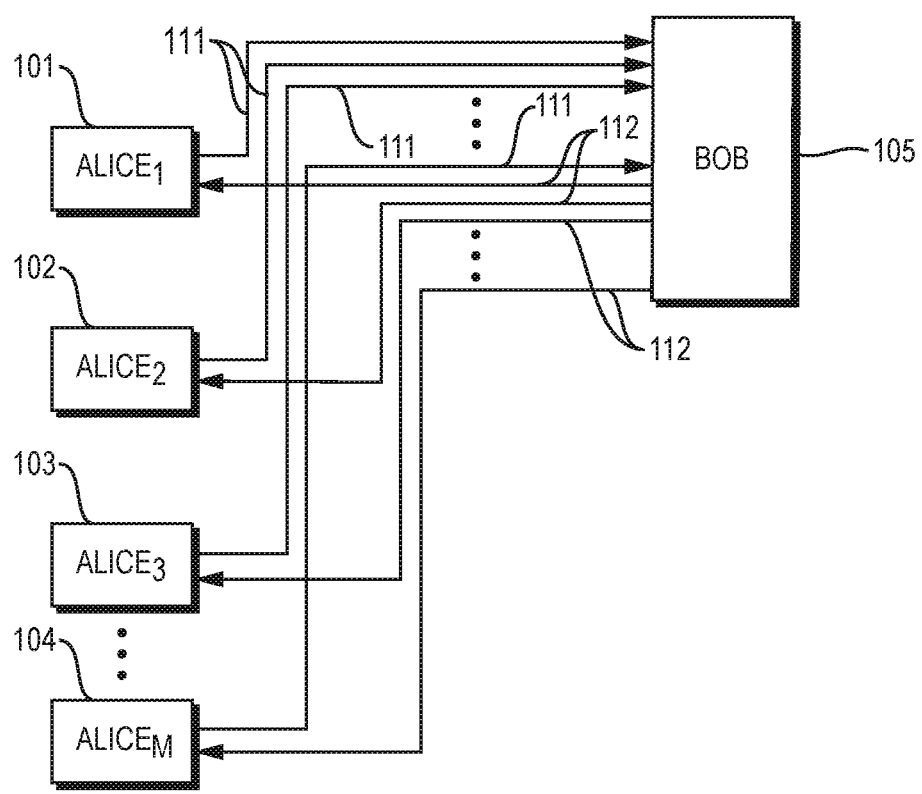
FIG. 2 is a conceptual diagram of peer-to-peer training of a DNN.

FIGS. 1 and 2 are conceptual diagrams of training of a DNN, in illustrative implementations of this invention. In FIG. 1, the training is performed in centralized mode. In FIG. 2, the training is performed in peer-to-peer mode. In both FIGS. 1 and 2: (a) the DNN is trained on data of M Alices (such as Alice$_1$, Alice$_2$, Alice$_3$, . . . , Alice$_M$); (b) during forward propagation, the then current Alice sends encrypted tensors and labels to Bob; and (c) during backward propagation, Bob passes encrypted gradients for the input layer of Bob's part of the DNN to the then current Alice. In FIGS. 1 and 2: (a) arrows 111 represent sending the encrypted tensors and labels from the current Alice to Bob, during forward propagation; and (b) arrows 112 represent sending, from Bob to the current Alice, the encrypted gradients for the input layer of Bob's part of the DNN, during backpropagation. In the example shown in FIGS. 1 and 2, each entity, respectively, that participates in the DNN (e.g., Bob and each of the Alices, respectively) may implement an SSL (secure socket layer) or TLS layer (transport layer security) cryptographic protocol for secure communication with the other entities that participate in the DNN. In FIGS. 1 and 2, Bob and the Alices each operate one or more computers. Thus, in FIGS. 1 and 2, items 101, 102, 103, 104 are the computer(s) operated by Alice$_1$, Alice$_2$, Alice$_3$, and Alice$_M$, respectively; and item 105 comprises the one or more computers operated by Bob. In FIGS. 1 and 2, computer(s) 101 have access to data of Alice$_1$; computer(s) 102 have access to data of Alice$_2$; computer(s) 103 have access to data of Alice$_3$; and computer(s) 104 have access to data of Alice$_M$.

In addition, in the example shown in FIG. 1 (centralized mode), the current Alice downloads an encrypted recovery snapshot from a weight server. The recovery snapshot, when decrypted, comprises trained weights and biases of the last trained Alice. This encrypted recovery snapshot is decipherable by the current Alice, but not by Bob. In FIG. 1, arrows 110 represent the downloading of the encrypted recovery snapshots. In FIG. 1, Bob operates the weight server. Alternatively, the weight server may be operated: (a) by an Alice; or (b) by a third party that is trusted by the Alices and by Bob.

Training on Data of Single Alice

In some implementations of this invention, a DNN is trained on data of a single entity (Alice). The training involves computations both by Alice and by a computing resource (Bob). For example, Bob may provide supercomputing resources for the training.

Let us define a deep neural network as a function F, topologically describable using sequence of layers $\{L_0, L_1, \ldots L_N\}$. For a given input (data), the output of this function is given by F(data) which is computed by sequential application of layers $F(data) \leftarrow L_N(L_{N-1} \ldots (L_0(data)))$.

Let $G_{loss}(output, label)$ denote the customized loss function used for computing gradients for final layer. Gradients may be backpropagated over each layer to generate gradients of previous layer and update current layer. Let $L_i^T(loss)$ denote the process of backpropagation over one layer and let $F^T(loss)$ denote backpropagation on the entire neural network. The backpropagation on the entire neural network comprises sequential backward passes $F^T(loss) \leftarrow L_1^T (L_2^T \ldots (L_N^T(loss)))$. Send(X,Y) represents the process of sending data X securely to entity Y. In the beginning, Alice and Bob may initialize their parameters randomly. Alice may then iterate over its dataset and transmit representations to Bob. Bob may compute losses and gradients and send the gradients back to Alice.

Algorithm 1 describes a method of securely training a deep neural classifier using a single data source (Alice), in an illustrative implementation of this invention.

| Algorithm 1 Secure Training on Data of a Single Alice. |
| --- |
| 1:     Initialize: <br>        $\phi \leftarrow$ Random Initializer (Xavier/Gaussian) <br>        $F_a \leftarrow \{L_0, L_1, \ldots L_n\}$ <br>        $F_b \leftarrow \{L_{n+1}, L_{n+2}, \ldots L_N\}$ |
| 2:     Alice randomly initializes the weights of $F_a$ using $\phi$ |
| 3:     Bob randomly initializes the weights of $F_b$ using $\phi$ |
| 4:     while Alice has new data to train on |
| 5:         Alice uses standard forward propagation on data <br>        $X \leftarrow F_a(data)$ |
| 6:         Alice sends $n^{th}$ layer output X and label to Bob <br>        Send((X,label),Bob). |
| 7:         Bob propagates incoming features on its network <br>        output $\leftarrow F_b(X)$ |
| 8:         Bob generates gradients for its final layer <br>        loss $\leftarrow$ G(output,label) |
| 9:         Bob backpropagates the error in $F_b$ until $L_{n+1}$ <br>        $F_b$,loss' $\leftarrow F_b^T$ (loss) |
| 10:    Bob sends gradient of $L_n$ to Alice <br>        Send(loss',Alice) |
| 11:    Alice backpropagates gradients received <br>        $F_{a',\_} \leftarrow F_a^T$ (loss') |
| 12:    end while |

We may evaluate the correctness and security of Algorithm 1. As used herein, "correctness" of an algorithm refers to whether the algorithm produces the same results as a network trained according to a prior-art, standard protocol (on a single computer). Security refers to whether Alice's data is kept confidential and cannot be discovered by Bob.

Correctness: In a prior-art, standard training procedure (on a single computer), we would first compute forward pass output$\leftarrow$F(data) and then compute loss gradients G(output, label). This loss would be backpropagated to refresh weights $F' \leftarrow F^T(loss)$. Since forward propagation is nothing more but sequential application of individual layers, F(data) is same as $F_b(F_a(data))$. Similarly, backpropagation $F^T(loss)$ has the identical output as sequential application of $F_a^T(F_b^T(\text{data}))$. Therefore, Algorithm 1 is correct—it will produce identical results as the standard training procedure.

Security: Let us evaluate whether Algorithm 1 is secure—specifically, in this case, whether Bob may invert parameters ($F_a$) used by Alice during the forward propagation.

In implementations of this invention in which Algorithm 1 is employed, Bob cannot discover the parameters used by Alice if $F_a$ contains at least one fully connected layer.

Lemma 1: Let a "configuration" denote an isomorphic change in network topology which leads to functionally identical network topology. Let layer M be a fully connected layer containing N outputs. Then layer M has at least N! configurations. Proof of Lemma 1: Let's construct a layer M and transpose N output neurons. The output of neurons is reordered without changing weights or affecting learning in any way. Since there are N! possible orderings of these neurons at least N! configurations are possible depending on how the weights were initialized.

Thus, we can prove that if Algorithm 1 is employed, Bob cannot discover the parameters used by Alice if $F_a$ contains at least one fully connected layer. The proof is as follow: Lemma 1 shows that Bob will have to go through at least N! possible configurations to invert the transformation applied by Alice. Since $N! > (N/2)^N > e^N$ this will require an exponential amount of time in layer size N. (In the preceding sentence, "e" is the base of the natural logarithm, which is approximately equal to 2.71828). For example, if the fully connected layer has 4096 neurons and each configuration could be tested in a second, it would take Bob more than the current age of universe to figure out parameters used by Alice.

Figure 3:
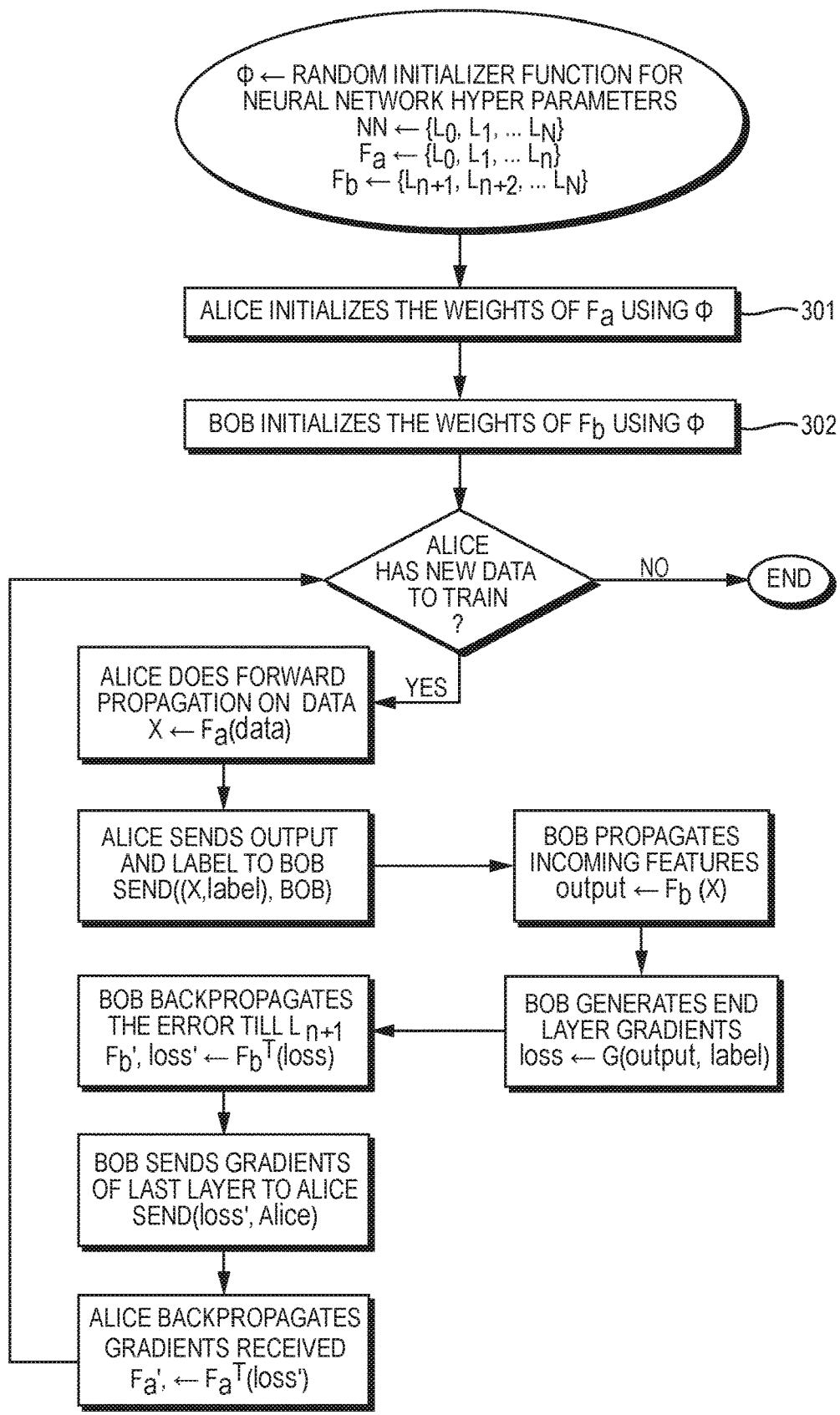
FIG. 3 is a flowchart for training a DNN on data from a single Alice.

FIG. 3 is a flowchart for training a DNN on data from a single Alice, in an illustrative implementation of this invention. As initial steps, Alice initializes the weights of Alice's part of the DNN (Step 301) and Bob initializes the weights of Bob's part of the DNN (Step 302).

Training of Data of Multiple Alices

In some implementations of this invention, a DNN is trained on data of multiple entities (Alices). The training involves computations by the Alices and by a computing resource (Bob). As in the single-Alice case, Bob may provide supercomputing resources for the training.

For this discussion of the multi-Alice case, we will use the same mathematical notations as above for neural network forward and backward propagation. Additionally, there are N data entities, each of them is denoted by $\text{Alice}_i$.

As an initialization step, Bob sends $\text{Alice}_1$ a topological description of first N layers. Alice and Bob use standard libraries for random initialization of their parameters. Bob sets $\text{Alice}_1$ as the last Alice it trained with. We modify Algorithm 1 and add a step which uses data from multiple entities in a round robin fashion, however $\text{Alice}_j$ may be required to update weights before beginning training. Alice(s) may update weights in a peer-to-peer or centralized fashion, please see below for detailed description of both. Once the weights are updated, $\text{Alice}_j$ continues its training.

Algorithm 2 describes a method of securely training a deep neural classifier using a multiple data sources (Alices), in an illustrative implementation of this invention.

| Algorithm 2 Secure Training on Data of Multiple Alices |
|---|
| 1: Initialize: |
|     $\phi \leftarrow$ Random Initializer (Xavier/Gaussian) |
|     $F_{a,1} \leftarrow \{L_0, L_1, ... L_n\}$ |
|     $F_b \leftarrow \{L_{n+1}, L_{n+2}, ... L_N\}$ |

| Algorithm 2 Secure Training on Data of Multiple Alices |
|---|
| 2:   Alice randomly initializes the weights of $F_{a,1}$ using $\phi$ |
| 3:   Bob randomly initializes the weights of $F_b$ using $\phi$ |
| 4:   Bob sets $\text{Alice}_1$ as last trained; $\text{Alice}_1$ transmits weights to $\text{Alice}_{2...N}$ |
| 5:   while Bob waits for next $\text{Alice}_j$ to send data |
| 6:       $\text{Alice}_j$ requests Bob for last $\text{Alice}_o$ that trained |
| 7:       $\text{Alice}_j$ updates its weights |
|         $F_{a,j} \leftarrow F_{a,o}$ |
| 8:       $\text{Alice}_j$ uses standard forward propagation on data |
|         $X \leftarrow F_{a,j}(\text{data})$ |
| 9:       $\text{Alice}_j$ sends $n^{th}$ layer output and label to Bob |
|         Send((X,label),Bob) . |
| 10:      Bob propagates incoming features on its network |
|         output $\leftarrow F_b(X)$ |
| 11:      Bob generates gradients for its final layer |
|         loss $\leftarrow$ G(output),label) |
| 12:      Bob backpropagates the error in $F_b$ until $L_{n+1}$ |
|         $F_b, \text{loss}' \leftarrow F_b^T(\text{loss})$ |
| 13:      Bob sends gradient of $L_n$ to $\text{Alice}_j$ |
|         Send(loss',$\text{Alice}_j$) |
| 14:      $\text{Alice}_j$ backpropagates the gradients it received |
|         $F_{a,j}',\_ \leftarrow F_{a,j}^T(\text{loss}')$ |
| 15:      Bob sets $\text{Alice}_j$ as last trained |
| 16:   endwhile |

In Algorithm 2, N means the total number of layers in the complete neural network, including the Alice part and the Bob part. In other words, N is equal to the number of neural layers in the Alice part of the DNN, plus the number of neural layers in the Bob part of the DNN.

For a given iteration of the loop in Algorithm 2, $\text{Alice}_o$ is the Alice that was last trained.

In Algorithm 2: (a) all the Alices may randomly initialize; and (b) $\text{Alice}_1$s random initialization may be used to start training. Alternatively, other approaches to initialization may be utilized.

Let us evaluate the correctness (as defined above) and security of Algorithm 2.

Correctness: We analyze whether training using Algorithm 2 produces identical results as the standard, prior-art training procedure (described above) would (under assumption that the data arriving at multiple entities is used in same sequence and random weights use same initialization). The correctness of Algorithm 2 stems from the fact that Bob and at least one of $\text{Alice}_o$ have identical neural network parameters at $\text{iteration}_k$. We use inductive techniques to prove that this is indeed the case.

Lemma 2: The neural network currently being trained in Algorithm 2 produces identical results as a neural network that is trained by just one entity.

Base Case: Assertion: $\text{Alice}_{1...N}$ have the same weights at beginning of first iteration. Proof: $\text{Alice}_1$ randomly initialized weights and transmitted them to $\text{Alice}_{2...N}$ in beginning making them produce identical results as training from just one entity.

Recursive Case: Assertion: If $\text{Alice}_j$ has correct weights at beginning of $\text{iteration}_i$ it will have correct weights at beginning of iteration i+1. Proof: $\text{Alice}_j$ performs backpropagation as the final step in iteration i. Since this backpropagation produces identical results as backpropagation applied over entire neural network at once, $\text{Alice}_j$ continues to have correct parameters at the end of iteration. ($F^T(\text{loss})$ produces identical results as sequential application of $F_{a,j}^T(F_b^T(\text{data}))$).

Note: the preceding proofs regarding the accuracy of Algorithms 1 and 2 (and the discussion below regarding the accuracy of Algorithm 3) assert that the results calculated by a standard, prior art approach would be identical to those produced by employing Algorithm 1, 2, or 3. This would be literally true, if the same random values were used for initialization for both (i) the standard approach (training on a single computer) and (ii) Algorithm 1, 2, or 3, as the case may be. If different initial values are used, then there may in practice be minor differences in results until, after a sufficient number of iterations during training, the different approaches converge to substantially identical results.

Security: We may reuse Lemma 1 to show that, in Algorithm 2, Bob does not have access to data used by Alice. Furthermore, for training with Algorithm 2, it is not possible, in a practical real-world scenario, for $Alice_{2...N}$ to figure out what data $Alice_1$ propagated through its network. This is because: in order to figure out what data $Alice_j$ has, $Alice_k$ would need to figure out a way to convert the updated weights it received in its current iteration to the data from forward propagation. Since Bob's topology is unknown to Alice, this would require Alice to search in the extremely large data space of all images and find which creates the closest backpropagation gradients.

Figure 4A:
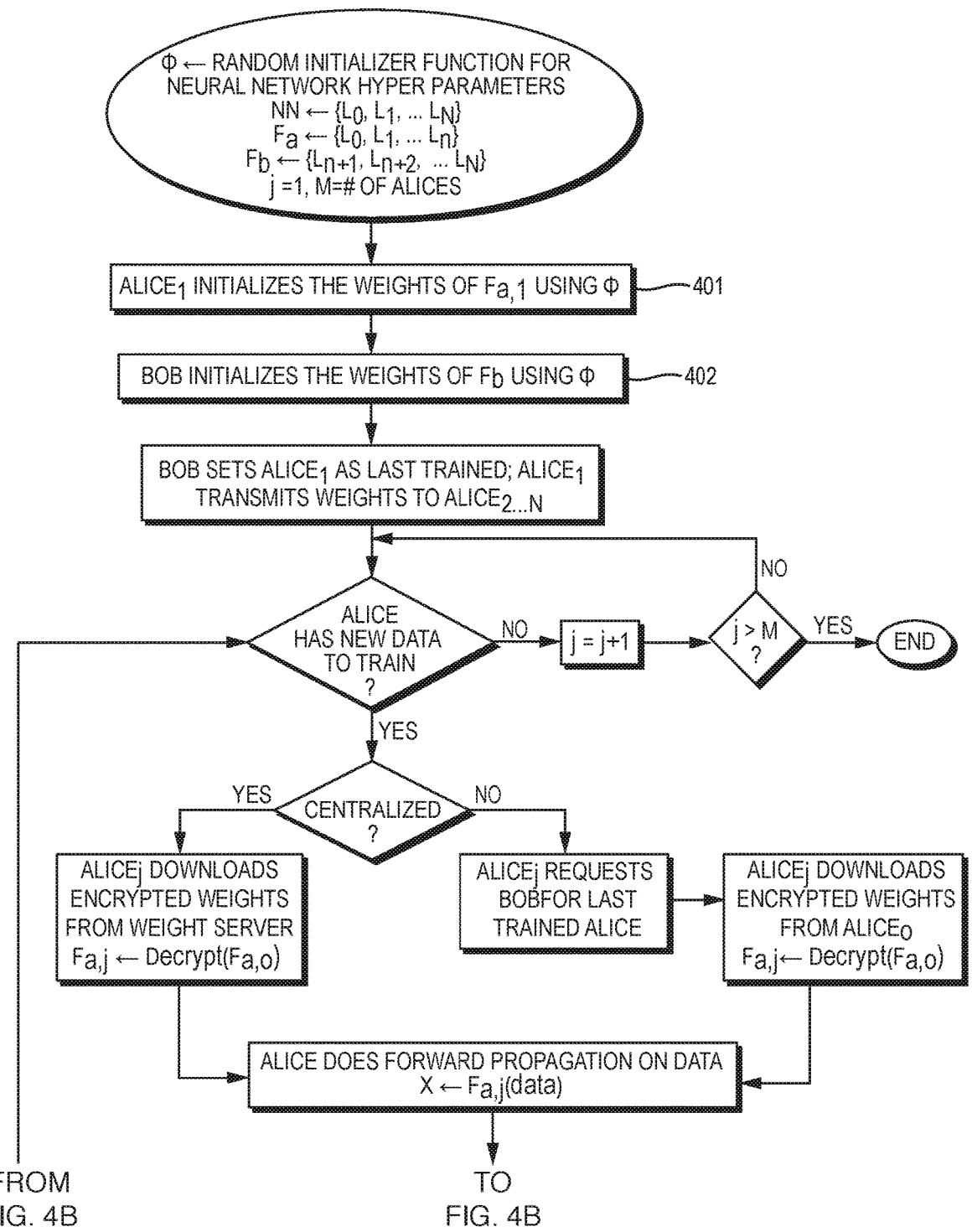
FIG. 4A and FIG. 4B together comprise a flowchart for training a DNN on data from multiple Alices.
Figure 4B:
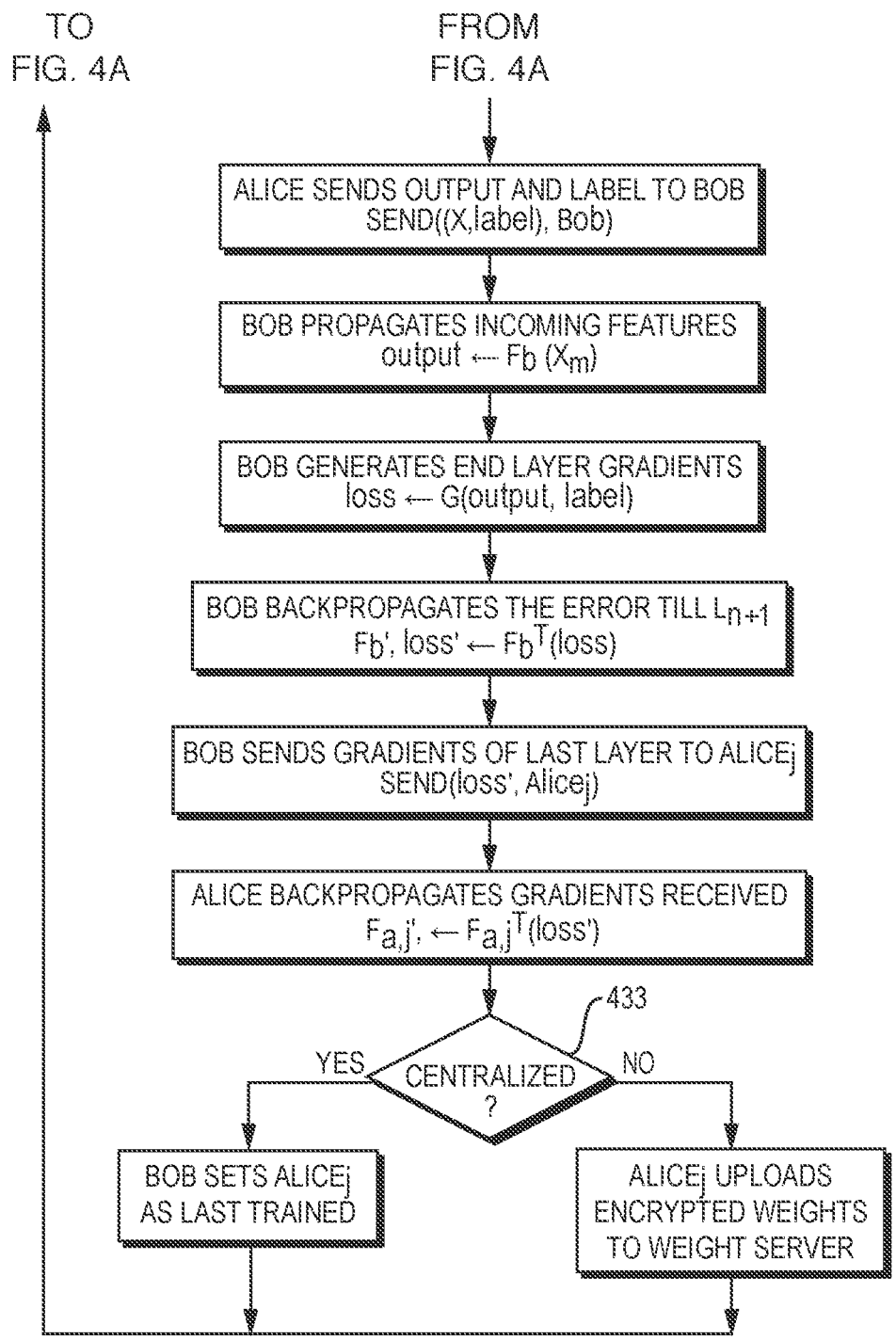

FIG. 4A and FIG. 4B together comprise a flowchart for training a DNN on data from multiple Alices, in an illustrative implementation of this invention. Among other things: (a) in FIG. 4A, as initial steps, $Alice_1$ initializes the weights of Alice's part of the DNN (Step 401) and Bob initializes the weights of Bob's part of the DNN (Step 402); and (b) in FIG. 4B, the manner in which weights are provided to the next Alice depends on whether the training is centralized (Step 433).

Performance of Prototype

We tested the performance of a prototype of this invention, which performed the algorithm shown in FIG. 4. This prototype was trained on the MNIST, CIFAR-10, CIFAR-100 and ILSVRC12 datasets, respectively. The testing shows that a network trained according to Algorithm 2 produces substantially identical as a network trained according to a standard, prior-art protocol (on a single computer).

This prototype implemented Algorithm 2 with software that uses Python® bindings for Caffe. This prototype was tested on datasets of various sizes (50K-1M) and classes (10, 100 or 1000 classes). The tests demonstrate that Algorithm 2 works across different topologies and demonstrates correctness (as defined above) of Algorithm 2.

Table 1 compares the accuracy of this prototype of this invention (trained according to Algorithm 2) to the accuracy of a network trained according to standard, prior-art approach (on a single computer).

TABLE 1

| Dataset | Topology | Accuracy (Standard, Single Computer Approach) | Accuracy (Algorithm 2) |
| --- | --- | --- | --- |
| MNIST | LeNet | 99.18% | 99.20% |
| CIFAR 10 | VGG | 92.45% | 92.43% |
| CIFAR 100 | VGG | 66.47% | 66.59% |
| ILSVRC 12 | AlexNet | 57.1% | 57.1% |

Table 1 shows that—for a wide variety of datasets and topologies—substantially the same accuracies were achieved by the prototype (training using Algorithm 2) as by a network trained according to a standard, prior-art approach (on a single computer).

The tests of this prototype verify that the prototype (trained according to Algorithm 2) takes a similar number of iterations to converge as a network trained in a standard manner on a single computer. This demonstrates that Algorithm 2 does not add major inefficiencies at an algorithmic level. For example, convergence tests were performed for training on the CIFAR 100 and MNIST. In these tests, the convergence characteristics achieved by this prototype (trained according to Algorithm 2) coincide closely to those achieved by a network trained using a standard, prior-art approach (on a single computer). While the overall convergence characteristics matched, there were small variations observed because of different parameter initializations at the beginning of training.

Advantageously, Algorithm 2 allows training on a dataset comprising data from multiple data sources (Alices). When using deep neural networks, larger datasets have been shown to perform significantly better than smaller datasets. The benefits of pooling data from multiple data sources (Alices) were demonstrated in tests, in which: (a) a dataset was uniformly divided between ten Alices, such that each Alice held 10% of the data, and (b) the neural network was trained on data of either 1, 5 or 10 Alices. As shown in Table 2, these tests show that adding more Alices causes accuracy to improve significantly.

TABLE 2

| Dataset | Accuracy using 1 Alice (10% of data) | Accuracy using 5 Alices (50% of data) | Accuracy using 10 Alices (100% of data) |
| --- | --- | --- | --- |
| MNIST | 97.54 | 98.93 | 99.20 |
| CIFAR 10 | 72.53 | 89.05 | 92.45 |
| CIFAR 100 | 36.03 | 59.51 | 66.59 |
| ILSVRC 12 | — | — | 57.1 |

The prototype that is described in this "Performance of Prototype" section is a non-limiting example of this invention. This invention may be implemented in many other ways.

Semi-Supervised Training

In some implementations of this invention, a split DNN is employed for semi-supervised learning, thereby greatly reducing number of labeled samples required for training. In some contexts, semi-supervised learning is desirable because: (a) in situations with fewer labeled data-samples, a reasonable approach includes learning hierarchical representations using unsupervised learning cite; (b) compressed representations generated by autoencoders may be used directly for classification; and (c) the losses of generative and predictive segments may be combined to perform semi-supervised learning, adding a regularization component while training on fewer samples cite.

In some implementations of this invention, a split DNN may incorporate semi-supervised learning and generative losses.

In some semi-supervised learning implementations of this invention: out of n layers for Alice, the first m layers are encoder and the remaining n−m layers belong to its decoder. $F_{e,i}$ denotes the forward propagation over encoder (computed by sequential application $L_m(L_{m-1} \ldots (L_0(data))))$. $F_{d,i}$ denotes application of decoder layers. During forward propagation, Alice may propagate data through all n layers and may send output from $m^{th}$ layer to Bob. Bob may propagate the output tensor from Alice through $L_{n...N}$ and may compute the classifier loss (logistic regression). Solely for purposes of this Section titled "Semi-Supervised Training" (and for purposes of Algorithm 3 and FIGS. 5A and 5B): (a) let loss define the logistic regression loss in predictive segment of neural network (last N−n layers owned by Bob), and let $loss_{enc}$ define the contrastive loss in autoencoder (completely owned by Alice(s)). Bob may compute loss using its softmax layer and may back-propagate this loss to layer $L_{n+1}$ giving gradients from classifier network [loss'←$F_b^T$(loss)]. Alice$_i$ may compute the autoencoder loss and may backpropagate it through its decoder network [$F_{d,i}^T$(loss$_{enc}$)].

In some implementations of this invention, semi-supervised learning is facilitated by combining weighted sum of two losses. The weight α is an added hyperparameter which may be tuned during training.

$$\eta \leftarrow F_b^T(\text{loss}) + \alpha * F_{d,i}^T(\text{loss}_{enc}) \quad \text{Equation 1}$$

After the initialization steps, Alice may input her data and forward propagate through the Alice part of the network and may send output from the encoder part to Bob. Bob may perform forward and backward propagation in Bob's part of the network and may send gradients to Alice. Alice may then combine losses from its decoder network with gradients received from Bob and may use them to perform backpropagation through the Alice part of the network.

---

Algorithm 3 Training Split NN with an Autoencoder for Semi-Supervised Learning.

1: Initialize:
   φ ← Random Initializer (Xavier/Gaussian)
   $F_{e,1} \leftarrow \{L_0, L_1, ... L_m\}$
   $F_{d,1} \leftarrow \{L_m, L_{m+1}, ... L_n\}$
   $F_b \leftarrow \{L_{n+1}, L_{n+2}, ... L_N\}$
2: Alice$_1$ randomly initializes the weights of $F_{a,1}$ using φ
3: Bob randomly initializes the weights of $F_b$ using φ
4: Bob sets Alice$_o$ = Alice$_1$.
5: while Bob waits for next feature vector from Alice$_j$
6:     Alice$_j$ requests Bob for last Alice$_o$ that trained
7:     Alice$_j$ updates its weights
       $F_{a,j} \leftarrow F_{a,o}$
8:     Alice$_j$ uses standard forward propagation on data
       $X_m \leftarrow F_{e,j}$(data)
       $X \leftarrow F_{d,j}(X_m)$
9:     Alice$_j$ sends $m^{th}$ layer output and label to Bob
       Send(($X_m$,label),Bob).
10:    Bob propagates incoming features on its network $F_b$
       output ← $F_b(X_m)$.
11:    Bob generates loss for its final layer
       loss ← G(output,label)
12:    Bob backpropagates the error in $F_b$ until $L_{n+1}$
       $F_{b'}$,loss' ← $F_b^T$(loss)
13:    Bob sends gradient for $L_n$ to Alice$_j$
       Send(loss',Alice$_j$)
14:    Alice$_j$ generates autoencoder loss for its decoder
       $F_{d,j'}$,loss'$_{enc}$ = $F_{d,j}^T$(X)
15:    Alice$_j$ backpropagates combined gradients
       $F_{a,-} \leftarrow F_a^T$ (η(loss',loss'$_{enc}$))
16:    Bob sets Alice$_j$ as last trained
17: endwhile

---

In step 15 of Algorithm 3, η is any function that combines losses. For example, in step 15 of Algorithm 3: (a) in some cases, the function η sums losses, such as η(x,y)=x+y; and (b) in some cases, the function η takes a weighted sum of losses, such as η(x,y)=ax+by, where a and b are constants.

Security: In Algorithm 3, Alice$^{1 \cdots N}$ cannot, in a practical real-world scenario, figure out what data Alice$^j$ propagated through its network. This is because: in order to figure out what data Alice$^j$ has, Alice$^{1 \cdots N}$ would need to convert backpropagated weights during an iteration to the data from forward propagation. Since Bob's topology is unknown to Alice—this converting would require Alice to search in the possible data space of all images and find a topology which creates same backpropagation loss, a space which is exponentially large compared to inputs. Lemma 1 may be adapted to prove that Bob doe not have access to data used by Alice, in Algorithm 3.

Accuracy of Algorithm 3: Lemma 2 shows how a network trained using same data and initialization over multiple agents produces identical results to one trained using standard techniques on one agent. Thus, Algorithm 3 is accurate.

Figure 5B:
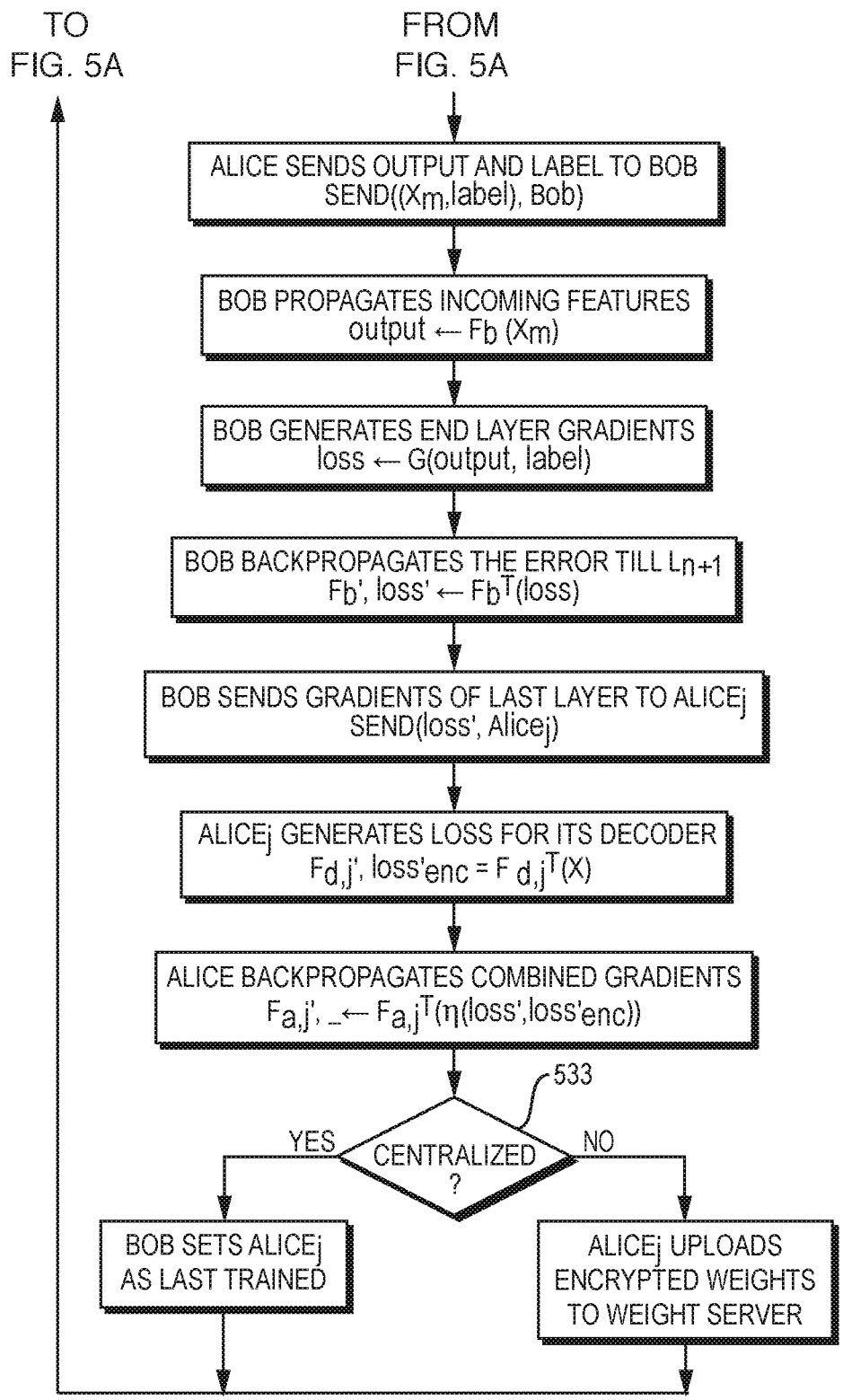

FIG. 5A and FIG. 5B together comprise a flowchart for semi-supervised training of a DNN on data from multiple Alices, in an illustrative implementation of this invention. Among other things: (a) in FIG. 5A, as initial steps, Alice' initializes the weights of Alice's part of the DNN (Step 501) and Bob initializes the weights of Bob's part of the DNN (Step 502); and (b) in FIG. 5B, the manner in which weights are provided to the next Alice depends on whether the training is centralized (Step 533).

Communication Among Bob and Alices During Training

In illustrative implementations of this invention, the training of the DNN(s) may be performed in an online fashion, by providing Bob output of forward propagation whenever there is new annotated data.

In some implementations, instead of transmitting the entire neural net, Alice$_i$ may initialize the weights randomly using a seed and may send the seed to Alice$_{1 \ldots N}$ thereby reducing network overhead. When a last trained Alice is asked for weights in peer-to-peer mode, the last trained Alice may (instead of sharing actual weights) share weight updates, which the last trained Alice adds to its parameters during the course of training. The weight update for each weight, respectively, may be cumulative (e.g., computed by subtracting the weight at the beginning of training from the current weight). Alice may also upload the encrypted weight updates to a weight server, making it harder to reverse engineer actual weights when using man-in-middle attack. Weights may be refreshed by Alice by combining its initial weights with subsequent weight updates it downloads from centralized weight server (or Alice(s) depending on mode). To facilitate centralized modality, step 6 of Algorithm 2 and Algorithm 3 may be modified, by replacing it with a request to download encrypted weights from weight server. Once training is over Alice$_j$ may upload the new encrypted weights to a weight server.

In illustrative implementations, safety against man-in-middle attacks may be ensured by using RSA (Rivest-Shamir-Adleman) cryptography and SSL encrypted sockets for network communication. Each client (e.g., Alice or Eve) may be given a unique user id and password which is used to establish identity of the client while connecting. When communicating over SSL, client and server may initiate a hand shake using the asymmetric public key provided by the server. After a successful handshake, client and server may agree upon a temporary key used during session to perform symmetric cryptography. Additional safeguards may be achieved by employing timeouts when either side is idle and by using trusted sources to generate SSL certificates.

In some implementations of this invention, standard json communication libraries are employed for asynchronous RPC (remote procedure call)

In some implementations of this invention: (a) once a secure connection is established using SSL, a communication protocol is employed for training a split DNN; and (b) this protocol defines network primitives (implemented as remote functions).

Table 3 lists non-exclusive examples of network primitives employed in this protocol.

TABLE 3

| Mode | Alice (Request) | Bob (Response) | Meaning |
|---|---|---|---|
| training request | mode: "training request" checksum: "<weight checksum>" nIter: <number iterations> client id: "<client identifier>" | response: "allowed" token: "<token>' | Bob is ready to train and Alice has most recent weights. Alice must initiate training using token within next 20 seconds or token will expire. |
| Training request | mode: "training request" checksum: "<weight checksum>" nIter: <number iterations> client id: "<client identifier>" | response: "denied' | Bob is currently training with another Alice or waiting for another Alice to start training. |
| Training request | mode: "training request" checksum: "<weight checksum>" nIter: <number iterations> client id: "<client identifier>" | response: "refresh" client id: ["$Alice^k$", "xxx.xxx.xxx.xxx"] | Checksum is old, Alice needs to refresh weights (most recent Alice ip is provided for peer-to-peer case). |
| Tensor transmission | mode: "training" checksum: "<tensor checksum>" shape: <tensor dimensions> raw_data: <serialized tensor> | response: "success/failure" | |
| Encrypted weight Upload (Centralized) | mode: "weight upload" checksum: "<weight checksum>" weights: <encrypted weight file> client id: "<client identifier>" | response: "successful" | Bob has registered checksum and stored $Alice^j$ weights. It has also snapshotted its weights. |
| Encrypted weight Upload (Centralized) | mode: "weight upload" checksum: "<weight checksum>" weights: <encrypted weight file> client id: "<client identifier>" | response: "failed" | Bob was not training with this Alice currently or lastly. |
| Encrypted weight request (Centralized) | mode: "weight request" client id: "<client identifier>" | weight: <encrypted weights file> | Bob allows for download of encrypted file. |
| Encrypted weight request (Centralized) | mode: "weight request" client id: "<client identifier>" | response: "denied" reason: "<string>' | Bob was not started in centralized mode, or never trained with an Alice. |
| Snapshot request (Peer-to-peer) | mode: "snapshot" checksum: "<weight checksum>" client id: "<client identifier>" | response: "successful" | Bob has registered checksum. It has also snapshotted its weights to match $Alice^j$. |
| Snapshot request (Peer-to-peer) | mode: "snapshot" checksum: "<weight checksum>" client id: "<client identified" | response: "failed" | Bob was not training with $Alice^j$ currently or lastly. |
| Encrypted weight request (Peer-to-peer) | [To $Alice_k$] mode: "weight request" client id: "<client identified" | weight: <encrypted weights file> | Alice provides most recent encrypted weights used in training with Bob. |
| Encrypted weight request (Peer-to-peer) | [To $Alice_k$] mode: "weight request" client id: "<client identified" | response: "denied" | This Alice never trained with Bob. |

In illustrative implementations of this invention, network primitives (a) are employed for communication among Bob and the Alices during training and (b) include primitives for (1) training requests, (2) tensor transmission and (3) weight update. These three categories of network primitives are described below.

Training request: In illustrative implementations, a training request is the first message sent by Alice to Bob in the beginning of a session. A training request message carries information to establish identity, such as a SHA-2 256 bit checksum (a cryptographically secure hash function) of latest weights available along with the number of training batches. Bob uses this to verify identity of Alice and to ensure that the weights available to Alice are the most recent weights. Once Bob has determined Alice's identity, Bob responds if Alice needs to refresh its weights. In case the checksum is older and a current Alice needs to refresh, the current Alice is provided with the identity of the last trained Alice. Bob disconnects after transmission in cases when message is malformed or identity is mismatched.

Tensor transmission: In illustrative implementations, the messages that transmit forward propagated activations (from Alice to Bob) and backpropagated losses (from Bob to Alice) may comprise tensors. These messages may include data that lists the shape (dimensions) of tensors. The transmitted messages may comprise raw data of tensors in a serialized form along with a checksum to ensure data integrity. The tensors from a single training batch may be transmitted as a single BLOB (binary large object). The BLOB may be a collection of binary data stored as a single object. In some implementations: (a) each individual tensor that is transmitted from Alice to Bob during forward propagation may represent all the output activations for the output layer of the Alice part of the DNN; and (b) each individual tensor that is transmitted from Bob to Alice during back propagation may represent all the gradient values for the input layer of Bob's part of the DNN. For testing purposes tensor transmission from Alice may include a mode string to specify if data used was training or validation.

Weight and bias updates: In illustrative implementations, which network primitives are employed for weight update depends on whether the DNN is being trained in peer-to-peer or centralized mode.

In peer-to-peer mode, Bob may send an identifier for the last trained Alice (e.g., an IP address for the last trained Alice), and the current Alice may use this identifier to connect over the internet with the last trained Alice and may then download encrypted weights and encrypted biases from the last trained Alice. In some cases, during training in peer-to-peer mode, all data resources (all Alices) remain online until training is completed (in order to ensure that, during training, a current Alice is always able to communicate with a last trained Alice).

In centralized mode, the last trained Alice may upload encrypted weights and encrypted biases to a weight server using an "Encrypted weight upload" primitive. When the next Alice (current Alice) wants to train, the current Alice downloads and decrypts these weights and biases. In centralized mode, the weight server (to which weights and biases are uploaded, and from which they are downloaded) may be operated by Bob, by an Alice, or a by a mutually trusted third party. For example, computer(s) 105 in FIGS. 1 and 2 may include a computer that is programmed to perform as a weight server. In many implementations in which training is done in centralized mode (e.g., if Bob is operating the weight server), it may be preferable to prevent Bob from deciphering the encrypted weights and biases. Thus, for example, the weights and biases may be encrypted using a high security standard, such as RSA 256.

In illustrative implementations of this invention, encryption and decryption (e.g., of weights, biases or weight or bias updates) may be performed using existing methods for PSK (pre-shared key) cryptography. An advantage of training in centralized mode is that other Alices (whose data is not then being used for training) may be offline while the DNN trains on data of a current Alice. A disadvantage of training in centralized mode is that, in some implementations, it is harder to add new nodes (Alices) since the new Alices may need to establish identity and obtain the PSK before attempting to train. In some implementations, shared cryptographic keys may be frequently updated to increase security against attacks.

In some implementations (in either peer-to-peer mode or centralized mode), the encrypted weights and encrypted biases that are uploaded to, stored on, and downloaded from the weight server may comprise weights and biases for all the nodes in the layers of the Alice part of the DNN. In illustrative implementations, once the DNN has trained on data of a first Alice, any new Alice starts with the weights and biases of the last trained Alice (instead of random weights).

Ensemble Training

As discussed above, in some implementations, a single network topology is trained.

Alternatively, in some implementations of this invention, an ensemble of classifiers (multiple DNNs) are trained on Alice's data by transmitting forward and backward tensors for all classifiers every iteration. A deep neural network classifier ensemble may comprise multiple deep neural network topologies (multiple DNNs) which perform classification. Advantageously, ensemble classifiers are more secure against network copy attacks and perform better in real world applications.

In some ensemble implementations of this invention: (a) the multiple network topologies (multiple DNNs) in the ensemble are trained individually by computing forward and backward functions for each DNN network; (b) each individual DNN in the ensemble is a split DNN, in which the current Alice performs computations for the Alice part of the DNN and Bob performs computations for the Bob part of the DNN (as described above, e.g., in accordance with Algorithm 1, 2, or 3); and (c) during test mode, the results outputted by the multiple DNNs in the ensemble are combined (e.g., by using majority vote) to produce a classification.

In some implementations of this invention, the ensemble may be trained by generating separate forward and backward propagation tensors for each neural network and transmitting them during each training iteration. This produces the same output as training individual networks one by one, but it saves time by combining iterations of various networks together.

Training of Tor-Like DNN

In some implementations of this invention, Tor-like layer-by-layer computation trains a split neural network over multiple entities (computers) with each entity performing computations for only a few layers of the neural network. Advantageously, this Tor-like method helps protect not just the data but also identity of an entity (Alice) sharing the data and the identity of an entity (Bob) performing classification. In this Tor-like approach: (a) additional entities $Eve_{0 \ldots M}$ are added; and (b) the Eves do not have access to data or complete network topology. Each Eve may perform computations for a relatively small number of network layers $F_k^{eve} \leftarrow L_q, L_{q+1} \ldots L_r$. During forward propagation, Alice may compute $F_a$ and pass it to $Eve_0$, which then passes it to $Eve_1$ and so on until it reaches $Eve_M$. $Eve_M$ is analogous to the exit node in Tor network. During forward propagation, $Eve_M$ may pass to Bob a tensor that represents output activations. Similarly, during backpropagating, Bob may compute gradients and send gradients to Eve$_M$, which may send gradients to Eve$_{M-1}$ and so on until gradients reach Eve$_0$ and then reach Alice. The onion-like organization of network layers may be used to keep Alice's identity confidential.

Student-Teacher Training

In some implementations of this invention, a trained, split DNN may be shared, by employing student-teacher methods for transferring information learnt by a neural network. In this approach, initial training of a so-called "teacher" DNN may be performed in any manner described herein (e.g., Algorithm 1, 2, or 3, or by a method described in FIG. 3, 4A, 4B, 5A, 5B, or 7). After the training phases are over, an Alice and Bob may use any publicly available dataset to train a secondary (student) neural network using outputs from the teacher neural network. Alice may input data from the publicly-available dataset into the Alice part of the trained teacher network, then Alice may propagate through the Alice part of the trained teacher network, and then Bob may propagate through the Bob part of the trained teacher network. Bob may then use the output of its layers (i.e., the values from the final layer of the teacher DNN after imputing the publicly available dataset and performing forward propagation) to train the student network on the same publicly-available dataset. This way, knowledge of a securely trained (teacher) network may be transferred to another (student) network which may be shared for public use. Advantageously, in some implementations of this invention, this student-teacher approach may facilitate deep learning in fields such as health, products and finance, where user data is an expensive commodity and needs to remain secure.

In some implementations: (a) the publicly-available dataset, on which the student network is trained, is unlabeled; and (b) the teacher network calculates the labels for the publicly-available dataset.

In some implementations, the student network may have the same topology as the teacher network. Alternatively, the topologies of the student network and teacher network may differ from each other. For example, the student network may have a VGG-16 topology and the teacher network may have a GoogleNet topology.

In some implementations, the knowledge that is transferred, from the teacher network to the student network, is knowledge of the classification task that has been learnt by the teacher network. The teacher network may be initially trained on a dataset comprising data from one or more Alices, and then, after being trained, may calculate labels for a publicly-available database. These labels may be used to train a student network on the same publicly-available dataset.

In some implementations of this invention, the teacher network has (during training on data of one or more Alices) learnt a highly non-linear function. Knowledge of this non-linear function may be transferred from the teacher network to the student network, by inputting data from a publicly-available database into the trained teacher network, and then sharing the outputs (labels) calculated by the teacher network. These outputs (labels) may be shared with the student network, while keeping information regarding the weights, biases and hyperparameters of the teacher network confidential (i.e., not sharing this confidential information with the student network). Furthermore, the initial dataset on which the teacher network was initially trained (comprising data of one or more Alices) may be kept confidential (i.e., not shared with the student network).

Figure 6:
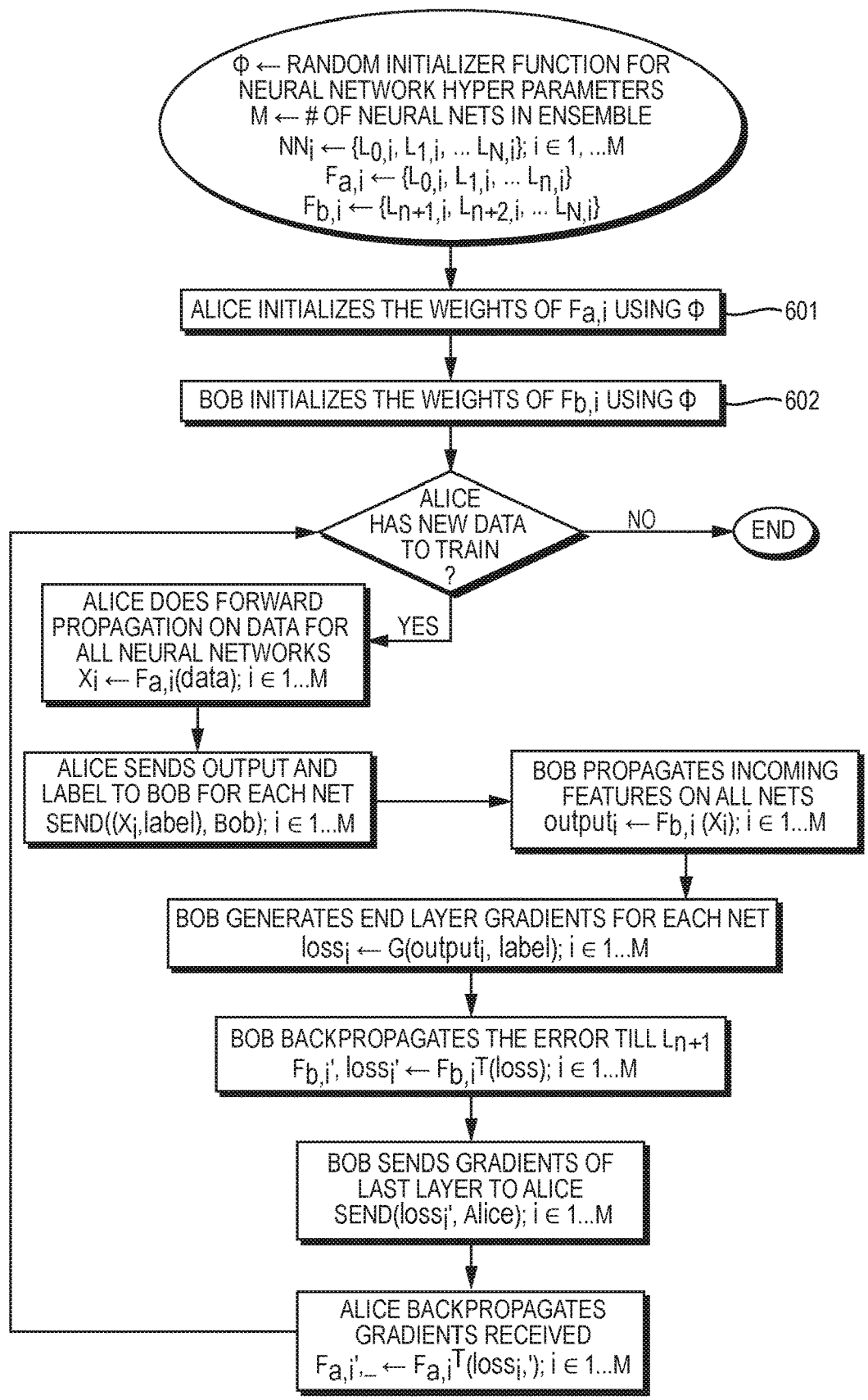
FIG. 6 is a flowchart for training an ensemble of DNNs on data from multiple Alices.
Figure 7A:
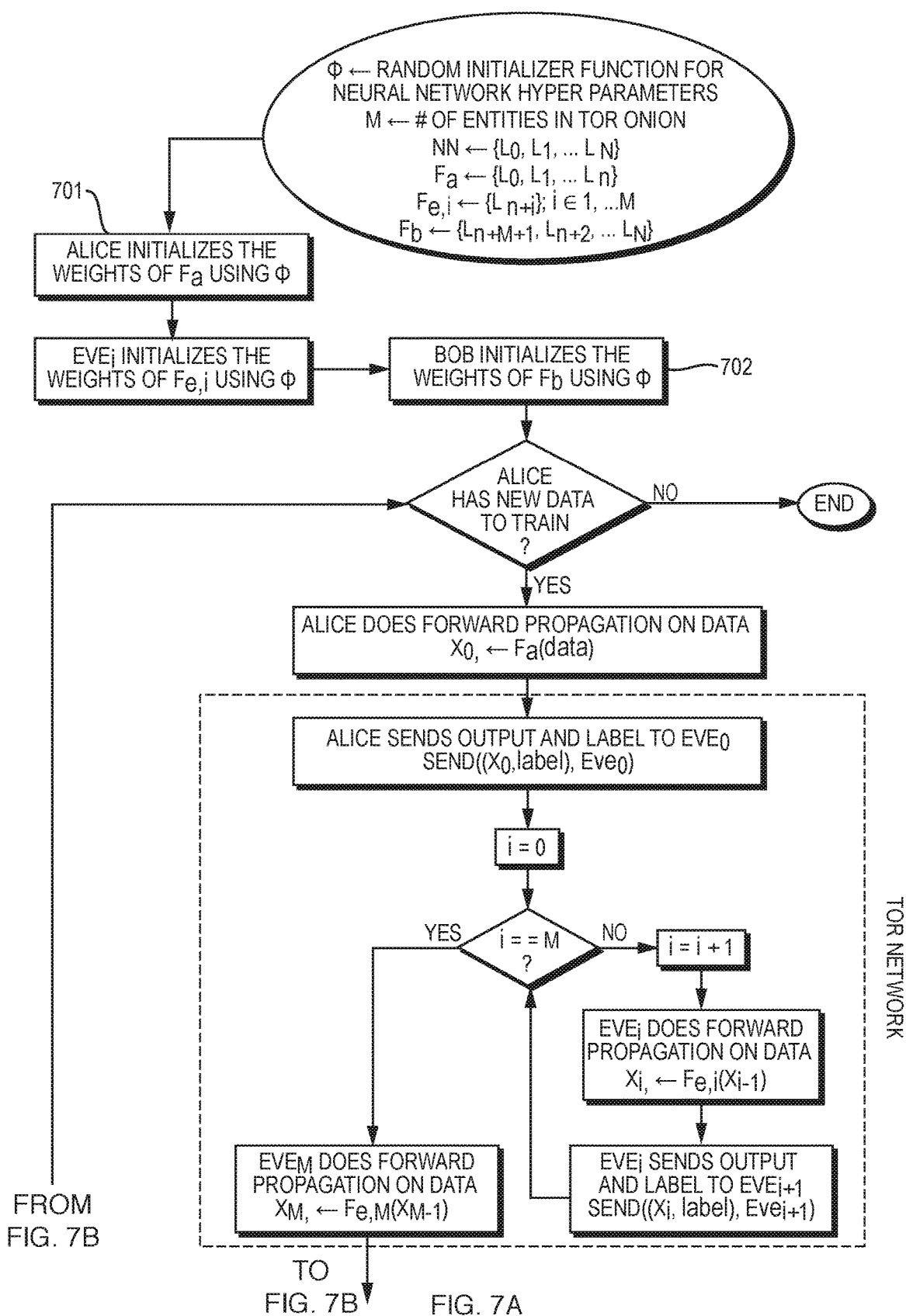
FIG. 7A and FIG. 7B together comprise a flowchart for training a Tor-like DNN.
Figure 7B:
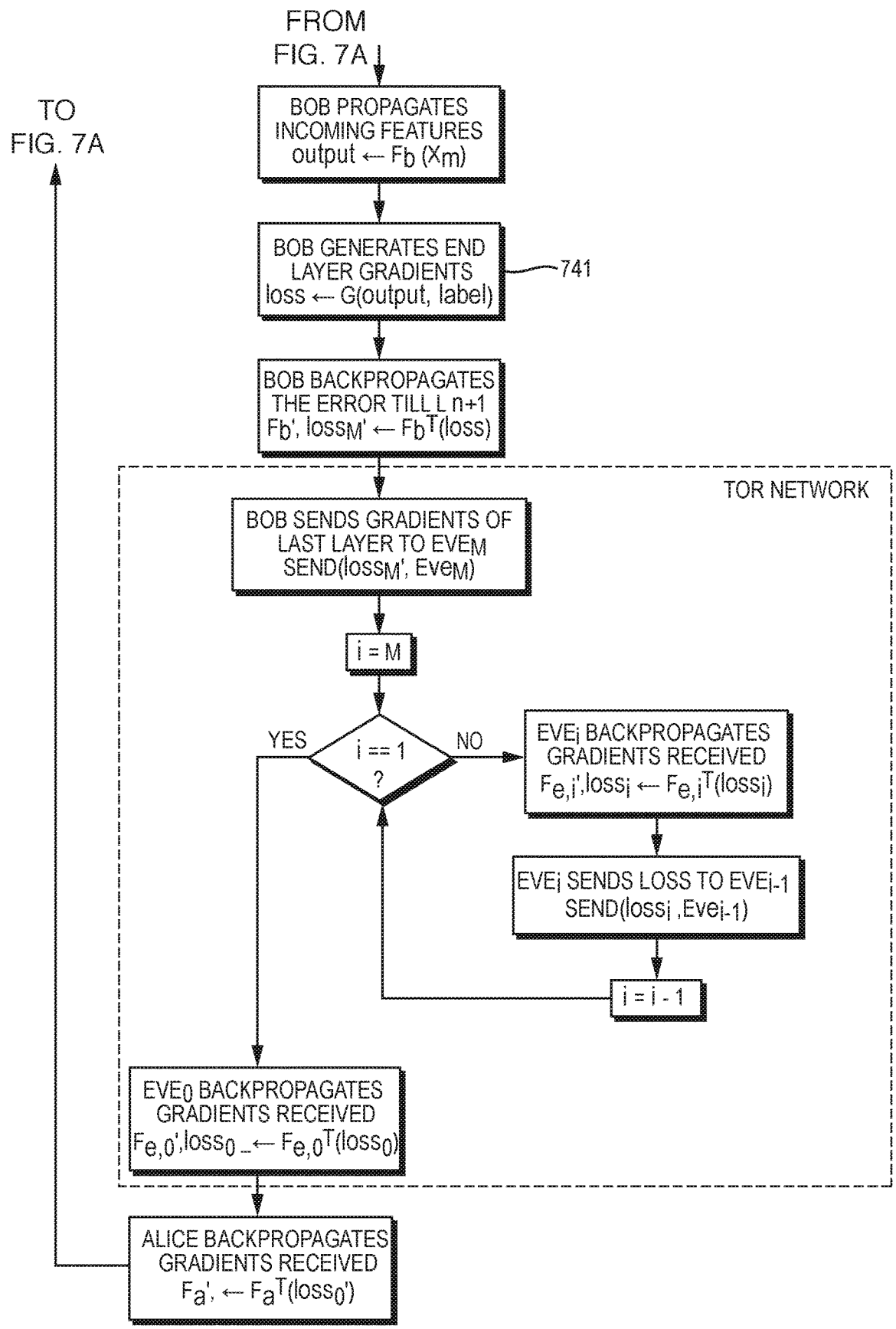
Figure 8:
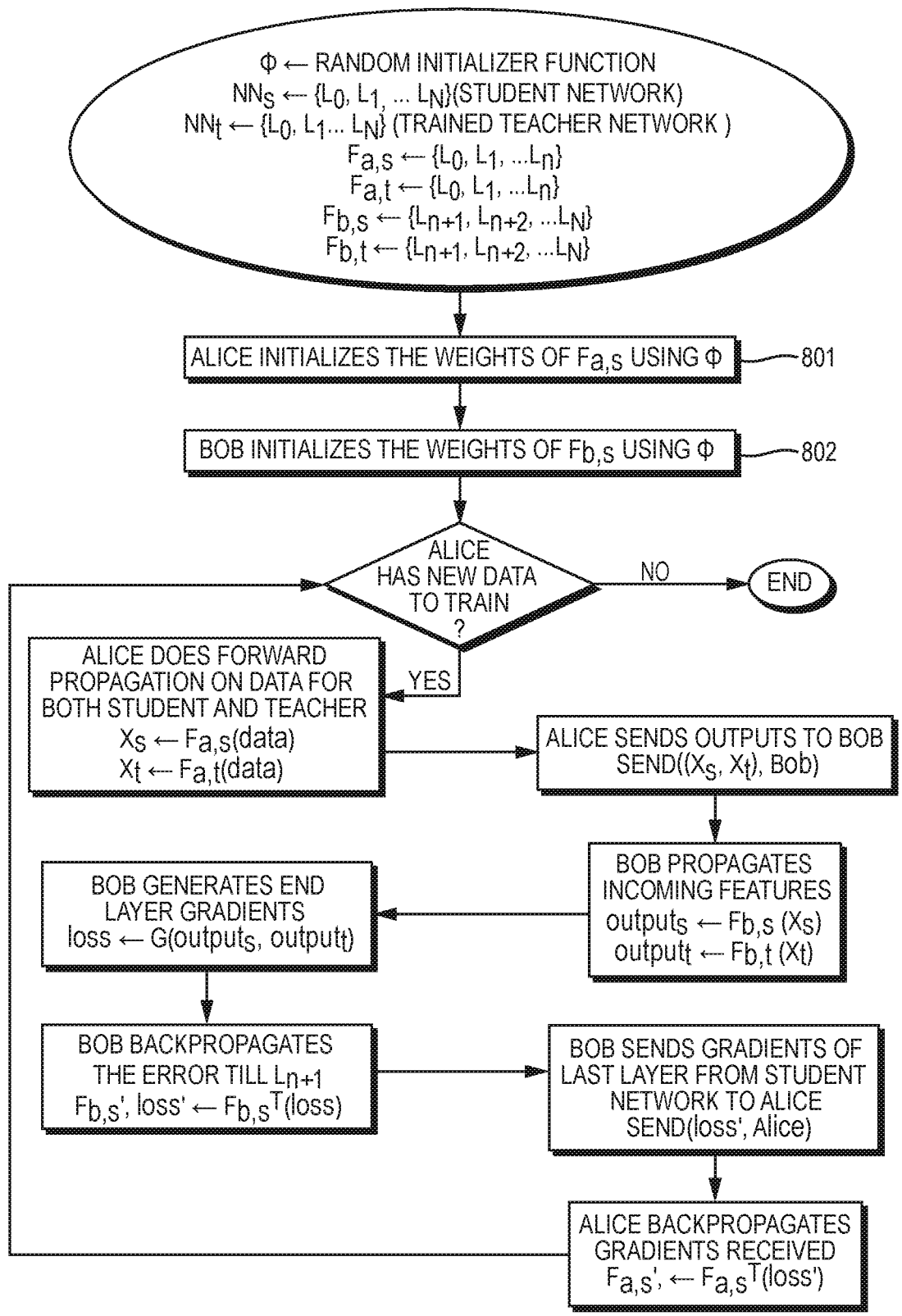
FIG. 8 is a flowchart for student-teacher training of a DNN.

FIGS. 6, 7 and 8

FIG. 6 is a flowchart for training an ensemble of DNNs on data from multiple Alices, in an illustrative implementation of this invention.

FIG. 7A and FIG. 7B together comprise a flowchart for training a Tor-like DNN, in an illustrative implementation of this invention.

FIG. 8 is a flowchart for student-teacher training of a student DNN, in an illustrative implementation of this invention.

In FIGS. 6, 7A, and 8, the steps include, among other things, that Alice' initializes the weights of Alice's part of the DNN (Steps 601, 701, 801) and Bob initializes the weights of Bob's part of the DNN (Steps 602, 702, 802). In FIG. 7B, the steps include, among other things, Bob generating end layer gradients (Step 741).

The methods shown FIGS. 6, 7A, 7B and 8 (ensemble, Tor-like and student-teacher) are not limited to scenarios where the DNN's are trained on data of only a single Alice. Alternatively, the ensemble DNN or Tor-like DNN may train on data of multiple Alices. Likewise, a teacher DNN may be trained on data of many Alices (e.g., according to Algorithm 2 or FIGS. 4A and 4B).

Other Implementations

As described above, in illustrative implementations, a split DNN may be employed for classification tasks. Alternatively, in some implementations, a split DNN is employed for regression and segmentation tasks.

In some implementations: (a) a split DNN that is trained may comprise an RNN (recurrent neural network), such as an LSTM (long-term short-term memory) network. The RNN (e.g., an LSTM) may be trained using any of the methods described above (e.g., Algorithm 1, 2 or 3 or the methods shown in the flowcharts in FIG. 3, 4A, 4B, 5A, 5B, 6, 7A, 7B, or 8). The training of the RNN may employ a Euclidean loss function or softmax loss function in Bob's part of the DNN when generating gradients.

More Details

In illustrative implementations: (a) neural layers in Alice's part of the DNN garble the raw data provided by Alice; and (b) because of this garbling, Bob is not able to reconstruct Alice's raw data.

In illustrative implementations, homomorphic encryption is not employed.

In illustrative implementations: (a) Bob may provide to Alice the topology (e.g., number of layers, number of neurons, how neurons connect) for the neural layers in Alice's part of the DNN. In some cases, Bob also provides to Alice activation functions for Alice's part of the DNN.

In illustrative implementations, Bob may keep hidden from Alice (i.e., not share with Alice): (a) a part of the network hyperparameters, such as learning rate, learning rate decay, weight decay, momentum, step size, or solver type; and (b) the topology of the layers in Bob. However, in some cases, Alice may infer that the number of nodes in the Bob's input layer equals the number of nodes in Alice's output layer).

In illustrative implementations, the output layer of Alice's part of the DNN and the input layer of Bob's part of the DNN may be any type of layer, such as fully connected, convolutional, max pool, locally connected layer, temporal convolution, spatial convolution, volumetric convolution, fractional max pool, mean pool, or average pool. In some implementations, the output layer of Alice's part of the DNN and the input of Bob's part of the DNN are the same type of layer, or have the same number of nodes, or both. Alternatively, in some implementations, the output layer of Alice's part of the DNN and the input of Bob's part of the DNN are different types of layers, or have different numbers of nodes, or both.

In illustrative implementations, the one or more DNN(s) may be trained on a dataset comprising data of multiple Alices. For example, this dataset may be horizontally partitioned among the Alices. Or, for example, this dataset may be vertically partitioned among the Alices. As used herein, to say that a dataset is "horizontally partitioned" into portions means that: (a) the dataset comprises multiple data objects with the same feature set and (b) each of the portions (into which the dataset is partitioned) comprises a subset of these multiple data objects with the same feature set. As used herein, to say that a dataset is "vertically partitioned" into portions means that each of these portions contains a different subset of the features in the dataset.

This invention may be implemented with a wide range of neural networks, including fully connected, convolutional, probabilistic, and recurrent neural networks, autoencoders, restricted boltzmann machines, densenet, and residual networks.

In illustrative implementations, a wide variety of activation functions may be employed, including ReLU (rectified linear unit), noisy ReLU, leaky ReLU, ELU (exponential linear unit), ramp function, rectifier function, softplus function, or sigmoid function.

More Practical Applications

In some implementations of this invention, a split neural network may be helpful in low data scenarios, by combining data from several resources. Furthermore, a split neural network, in accordance with this invention, may be beneficial in training using proprietary data sources when data sharing is not possible. It may also be of value in areas such as biomedical imaging, when training of deep neural network without revealing personal details of patients and minimizing computation resources required on devices.

Prototype Source Code

In the Computer Program Listing above, 18 computer program files are listed. These 18 computer program files comprise software employed in a prototype of this invention.

In the prototype, Python® software and Caffe software were installed on the computers that executed these computer files.

Ten of these computer files were originally written in Python®, with .py file name extensions. But their file name extensions were changed to .txt to facilitate filing with the patent office. Specifically, these ten files are: (1) alice.txt, (2) alice_weight_server.txt, (3) bob_server.txt, (4) bob_weight_server.txt, (5) conn_utils. txt, (6) encryption_utils.txt, (7) md5sum.txt, (8) pylayr.txt, (9) rpc_config.txt, and (10) run_solver txt. In order to execute these ten files, rename them by replacing the .txt file name extension with the .py file name extension Eight (out of these 18 computer files) were originally written in Caffe, with .prototxt file name extensions. But their file name extensions were changed to .txt to facilitate filing with the patent office. These eight files were written for use with different models (four for use with a mnist model, and four for use with an alexnet model). MNIST is a handwritten digit recognition dataset. The mnist model is used for hand written digit recognition. Alexnet is a model used for large scale image recognition.

Mnist Model: As noted above, four files are used for a mnist model: (1) alice_solver_C1.txt, (2) alice_train_test_C1.txt; (3) bob_solver_C1.txt, and (4) bob_train.txt. In order to execute these four files for the mnist model, rename them by replacing the "_C1.txt" at the end of their names with ".prototxt".

Alexnet Model: As noted above, four files are used for an alexnet model: (1) alice_C2.txt, (2) alice_solver_C2.txt; (3) bob_C2.txt, and (4) bob_solver_C2. In order to execute these four files for the alexnet model, rename them by replacing the "_C2.txt" at the end of their names with ".prototxt".

Here is a description of these 18 computer program files:

(1) alice.txt: This alice software file describes the Alice part of the DNN. To run this file, specify a solver (prototxt format) used to describe client side layers while training. Every time the client is started, this file checks (@check_hub) if the remote hub (Bob) is up and if it is, this file sends the checksum to Bob. Bob then verifies checksum and tells Alice if it may train or not depending on if the checksum is latest. In case weights checksum is old, Alice refreshes weights (@refresh_weights) in peer-to-peer or centralized mode. Then it sends new checksum and attempts training. Once training is completed, Alice sends new checksum to Bob. If operating in centralized mode, the encrypted weight are also uploaded s to the weight server.

(2) alice_weight_server.txt: The alice_weight_server software file serves encrypted weights when training in peer-to-peer mode. Each Alice which successfully trains has an instance of alice_weight_server running. This may be implemented as an https server to send encrypted binary weights.

(3) bob_server.txt: The bob_server file is code for Bob's server, and runs as a standalone thread. This program, while running, continuously waits for Alices to connect and train. It implements checks for weights checksums and protocol for split neural network training. The command line arguments include descriptions of topology of Bob's part of the DNN. The program automatically accepts or rejects training requests based on Alice's checksum. It also implements checks for failure cases such as Alice crashing, Bob crashing. It snapshots training parameters to save the progress.

(4) bob_weight_server.txt: This bob_weight_server software performs uploading and downloading of encrypted weights to and from a weight server, in centralized mode. The weights are uploaded by the last trained Alice and downloaded by the current Alice. The weight server may be run by Bob, an Alice or a mutually trusted third party. Only Alice(s) has(ve) capability to decrypt these weights.

(5) conn_utils.txt: This conn_utils software performs functions for networking utilities, including the following five functions: (i) encode_packet, which encodes the packets for transmitting tensors, and contains information such as state (Train/Test), iteration no and serialized data; (ii) NBytes (Blocking), which reads fixed number of bytes from a given socket; (iii) decode_packet, which converts packet into numpy array with specified dimensions; (iv) ConnUtilsServer, which defines a class to run a server from given port and host name, and creates blocking sockets with necessary timeouts; (v) ConnUtilsServerSecure, which starts a secure SSL/TLS socket server.

(6) encryption_utils.txt: The encryption_utils software encrypts and decrypts binary strings. This software code may be used to AES (advanced encryption standard) encrypt binary files in a symmetric fashion. This file may be used by Alice to encrypt weights before uploading it on weight server or during weight exchange to prevent a man-in-the-middle attack.

(7) md5sum.txt: This md5sum software computes md5 sums of files.

(8) pylayr.txt: This pylayr software file is for specialized neural network layers used to transmit tensors between Alice and Bob. This file describes two classes (i) BegLayer and (ii) EndLayer. BegLayer continues forward pass for Alice for layer $L_n$ and transmits it to Bob. Then it waits for Bob to return gradient tensor which it backpropagates through Alice network. EndLayer serves as a pseudo-data layer for Bob. It embeds in Bob's neural network topology without changing it, sending the tensor it receives forward through neural network.

(9) rpc_config.txt: This rpc_config software holds and saves configuration. All configurations and constants may be stored in this file. The file allows one to flip flags and change between peer-to-peer or centralized mode. It has constants for hostname and ip addresses. It also has location for secure keys used during SSL transmission. Apart from this, it contains logic to save the current state of server and client as a json file. Advantageously, this facilitates resuming training in case Alice or Bob have network disconnection.

(10) run_solver.txt: This run_solver software code is for training. This code may step through the training pipeline one by one. This code may be used to train the Alice and Bob (e.g., by implementing Algorithm 1), by helping to specify their topologies. This code may make it much easier to do fast training when only one Alice is present. In addition, it produces human readable output about progress of training, and any debugging messages

(11) alice_train_test_C1.txt: This alice_train_test software describes topology for Alice's part of the DNN, including sequential layers $L_0, L_1, L_2, \ldots L_{n+1}$.

(12-13) alice_solver: This alice_solver file sets forth hyperparameters for Alice's part of the DNN, but not for Bob's part of the DNN. Hyperparameters tend to be dataset dependent. Hence, there are two versions of the alice.solver file attached: (a) alice_solver_C1.txt, and (b) alice_solver_C2.txt. Only one of them is used at any given time, for training with a given model. As discussed above, alice_solver_C1.txt is for use with a mnist model, and alice_solver_C2.txt is for use with an alexnet model.

(14-15) bob_solver.txt: This bob_solver file sets forth hyper parameters for both Bob's part and Alice's part of the DNN network. As noted above, hyperparameters tend to be dataset dependent. Hence, there are two versions of the bob.solver file attached: (a) bob_solver_C1.txt, and (b) bob_solver_C2.txt. Only one of them is used at any given time, for training with a given model. As discussed above, bob_solver_C1.txt is for use with a mnist model, and bob_solver_C2.txt is for use with an alexnet model

(16) bob_train_test_C1.txt: This bob_train_test software helps to describe topology for Bob's part of the DNN.]

(17) alice_C2.txt: This file helps to describe topology for Alice's part of the DNN.

(18) bob_C2.txt: This file helps to describe topology for Bob's part of the DNN.

This invention is not limited to the software set forth in these eighteen computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to send or receive signals to communicate over a network; (2) to train one or more neural networks on a set of training data; (3) to calculate a set of weights to minimize error on a training set; (4) to perform forward propagation and backpropagation; (5) to calculate a gradient or partial derivative for a loss function with respect to each weight, respectively, in a neural network; (6) to perform supervised learning; (7) to perform unsupervised learning, such as with an autoencoder; (7) to implement TLS (transport layer security) or SSL (secure socket layer) security; (8) to train a neural network in either peer-to-peer mode or centralized mode; (9) to perform any other calculation, computation, program, algorithm, or computer function described or implied above; (10) to receive signals indicative of human input; (11) to output signals for controlling transducers for outputting information in human perceivable format; (12) to process data, to perform computations, to execute any algorithm or software, and (13) to control the read or write of data to and from memory devices (items 1-13 of this sentence referred to herein as the "Computer Tasks"). The one or more computers (e.g., 101, 102, 103, 104, 105) may communicate with each other or with other devices either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, multiple computers (e.g., 101, 102, 103, 104, 105) are configured for wireless or wired communication with each other in a network.

For example, in some cases, one or more computers in a network each include a wireless module for wireless communication with other electronic devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 101, 102, 103, 104, 105) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

To say that X is "denoted in this claim" as Y means X is denoted as Y in this claim and in any claim that is dependent on this claim.

For an event to occur "during" a time period, it is not necessary that the event occur throughout the entire time period. For example, an event that occurs during only a portion of a given time period occurs "during" the given time period.

The term "e.g." means for example.

Each equation above is referred to herein by the equation number set forth to the right of the equation. For example: "Equation 1" means Equation 1 above. Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

"Forward and back propagation" means forward propagation and backpropagation.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Input layer" is defined above.

The term "or" is inclusive, not exclusive. For example, A or B is true if A is true, or B is true, or both A or B are true. Also, for example, a calculation of A or B means a calculation of A, or a calculation of B, or a calculation of A and B.

"Output layer" is defined above.

A parenthesis does not mean that the parenthetical material is optional or may be ignored.

A "set of computers" means a set of one or more computers.

"Sets of one or more computers each" means sets, each of which sets comprises one or more computers.

Unless the context clearly indicates otherwise, "some" means one or more.

"SSL" means secure socket layer or transport layer security.

To say that a first value and second value are "substantially identical" or "substantially the same" means that the first and second values differ from each other by two percent or less.

The term "such as" means for example.

"Test mode" means a mode of operation that occurs after training and that does not involve training. Here is a non-limiting example: a trained DNN operates in test mode when, after the DNN is trained, the DNN receives data as input and outputs a classification.

To say that a machine-readable medium is "transitory" means that the medium is a transitory signal, such as an electromagnetic wave.

"Voting function" means a function that takes, as input, a set of multiple classifications, and that outputs a classification. A non-limiting example of a voting function is sometimes called a "majority-vote" function and outputs the classification that occurs most frequently in the set of input classifications.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method of training a neural network, partially on a first set of one or more computers and partially on a second set of one or more computers, wherein: (a) the network comprises a first part and a second part, the first and second parts of the network being denoted as the "Bob part" and "Alice part", respectively, and the first and second sets of computers being denoted as the "Bob computer" and "Alice computer", respectively; (b) the Alice part of the network comprises three or more neural layers; (c) the Bob part of the network comprises two or more neural layers; (d) a first dataset is inputted into an input layer of the Alice part of the network; (e) the Alice computer performs forward propagation through the Alice part of the network; (f) output activations of an output layer of the Alice part of the network are sent to the Bob computer and are inputted into an input layer of the Bob part of the network; (g) the Bob computer performs forward propagation through the Bob part of the network; (h) the Bob computer calculate losses and gradients; (i) the Bob computer performs backpropagation through the Bob part of the network; (j) gradients of the input layer of the Bob part of the network are sent to the Alice computer; (k) the Alice computer performs backpropagation through the Alice part of the network; and (l) the Bob computer does not have access to the first dataset. In some cases, for one or more layers of the Bob part of the network, the Alice computer does not have access to any data that specifies topology of the one or more layers. In some cases, the Alice computer does not have access to data that specifies any hyperparameter of the network that is in the group of hyperparameters consisting of learning rate, learning rate decay, weight decay, and momentum. In some cases: (a) an ensemble includes the neural network and also includes one or more additional neural networks; (b) for each respective additional network in the ensemble, (i) the respective network comprises a first portion and a second portion, the first and second portions of the respective network being denoted as the "Bob portion" and "Alice portion", respectively, (ii) the Alice portion of the respective network comprises three or more neural layers, (iii) the Bob portion of the respective network comprises two or more neural layers, (iv) the first dataset is inputted into an input layer of the Alice portion of the respective network, (v) the Alice computer performs forward propagation through the Alice portion of the respective network, (vi) output activations of an output layer of the Alice portion of the respective network are sent to the Bob computer and inputted into an input layer of the Bob portion of the respective network, (vii) the Bob computer performs forward propagation through the Bob portion of the respective network, (viii) the Bob computer calculates losses and gradients, (ix) the Bob computer performs backpropagation through the Bob portion of the respective network, (x) gradients of the input layer of the Bob portion of the respective network are sent to the Alice computer, and (xi) the Alice computer performs backpropagation through the Alice portion of the respective network; and (c) during test mode, each network in the ensemble, respectively, outputs a classification, such that the networks in the ensemble collectively output a set of classifications; (d) based on the set of classifications, a classification is determined according to a voting function; and (e) none of the networks in the ensemble is identical to any other network in the ensemble. In some cases: (a) during test mode after the network is trained, the network takes, as input, a second dataset and outputs labels regarding the second dataset; (b) the labels are shared with an additional set of one or more computers; (c) the additional set of computers performs forward and back propagation in a second network while training the second network; (d) the additional set of computers trains the second network on the second dataset, by a training that includes employing the labels that were shared; (e) the additional set of computers does not have access to the first dataset; and (f) the first dataset is not identical to the second dataset. In some cases, (a) the network mentioned in the first sentence of this paragraph has a first topology; (b) the second network has a second topology; and (c) the first topology is different than the second topology.

Each of the cases described above in this paragraph is an example of the method described in the first sentence of this paragraph, and is also an example of an embodiment of this invention that may be combined with other embodiments of this invention.

In some implementations, this invention is a method of training a neural network, partially on a first set of one or more computers and partially on other sets of one or more computers each, wherein: (a) the network comprises a first part and a second part, the first and second parts of the network being denoted as the "Bob part" and "Alice part", respectively, the first set of computers being denoted as the "Bob computer", and each of the other sets of computers, respectively, being denoted as an "Alice computer"; (b) the Alice part of the network comprises three or more neural layers; (c) the Bob part of the network comprises two or more neural layers; (d) for each respective Alice computer (i) a dataset is inputted by the respective Alice computer into an input layer of the Alice part of the network; (ii) the respective Alice computer performs forward propagation through the Alice part of the network; (iii) output activations of an output layer of the Alice part of the network are sent to the Bob computer and inputted into an input layer of the Bob part of the network; (iv) the Bob computer performs forward propagation through the Bob part of the network; (v) the Bob computer calculates losses and gradients; (vi) the Bob computer performs backpropagation through the Bob part of the network; (vii) gradients of the input layer of the Bob part of the network are sent to the respective Alice computer, and (viii) the respective Alice computer performs backpropagation through the Alice part of the network; and (e) the Bob computer has access to no database inputted in clause (d)(i). In some cases, for one or more layers of the Bob part of the network, none of the Alice computers have access to any data that specifies topology of the one or more layers. In some cases, for a set of hyperparameters of the network, none of the Alice computers have access to data that specifies any hyperparameter of the network that is in the group of hyperparameters consisting of learning rate, learning rate decay, weight decay, and momentum. In some cases, each Alice computer has access to no database inputted in clause (d)(i) by any other Alice computer. In some cases, after a first Alice computer performs steps (d)(ii) and (d)(viii): (a) the first Alice computer uploads encrypted weights of the Alice part of the network to a server; and (b) a second Alice computer downloads the encrypted weights from the server. In some cases: (a) after a first Alice computer performs steps (d)(ii) and (d)(viii) the first Alice computer uploads encrypted weight updates for the Alice part of the network to a server, and a second Alice computer downloads the encrypted weight updates from the server; and (b) each weight update, respectively, denotes a change in a given weight from an earlier value of the given weight. In some cases, the server is a computer in the Bob computer. In some cases, the server is a computer in an Alice computer. In some cases, after a first Alice computer performs steps (d)(ii) and (d)(viii): (a) the Bob computer sends to the first Alice computer data that identifies a second Alice computer, or sends to the second Alice computer data that identifies the first Alice computer; and (b) the first Alice computer sends weights for the Alice part of the network to the second Alice computer. In some cases: (a) after a first Alice computer performs steps (d)(ii) and (d)(viii) the Bob computer sends to the first Alice computer data that identifies a second Alice computer, or sends to the second Alice computer data that identifies the first Alice computer, and the first Alice computer sends weight updates for the Alice part of the network to the second Alice computer; and (b) each weight update, respectively, denotes a change in a given weight from an earlier value of the given weight. Each of the cases described above in this paragraph is an example of the method described in the first sentence of this paragraph, and is also an example of an embodiment of this invention that may be combined with other embodiments of this invention.

In some implementations, this invention is a method of training a neural network, partially on a first set of one or more computers and partially on other sets of one or more computers each, wherein: (a) the network comprises a first part and a second part, the first and second parts of the network being denoted as the "Bob part" and "Alice part", respectively, the first set of computers being denoted as the "Bob computer", and each of the other sets of computers, respectively, being denoted as an "Alice computer"; (b) the Alice part of the network comprises an encoder and a decoder; (c) the Bob part of the network comprises two or more neural layers; (d) for each respective Alice computer (i) a dataset is inputted by the respective Alice computer into an input layer of the Alice part of the network; (ii) the respective Alice computer performs forward propagation through the Alice part of the network; (iii) output activations of an output layer of the Alice part of the network are sent to the Bob computer and inputted into an input layer of the Bob part of the network; (iv) the Bob computer performs forward propagation through the Bob part of the network; (v) the Bob computer calculates losses and gradients; (vi) the Bob computer performs backpropagation through the Bob part of the network; (vii) gradients of the input layer of the Bob part of the network are sent to the respective Alice computer, and (viii) the respective Alice computer combines gradients from the decoder and gradients from the Bob part of the network, and performs backpropagation in the Alice part of the network; and (e) the Bob computer has access to no database inputted in clause (d)(i). In some cases, for one or more layers of the Bob part of the network, none of the Alice computers have access to any data that specifies topology of the one or more layers. Each of the cases described above in this paragraph is an example of the method described in the first sentence of this paragraph, and is also an example of an embodiment of this invention that may be combined with other embodiments of this invention.

In some implementations, this invention is a method of training a neural network, partially on a first set of one or more computers, partially on a second set of one or more computers, and partially on S other sets of one or more computers each, S being the number of other sets, wherein: (a) the network comprises a first part, a second part, and S other parts, the first part being denoted as the "Bob part", the second part being denoted as the "Alice part", and each of the S other parts, respectively, being denoted as an "Eve part", the first set of computers being denoted as the "Bob computer", the second set of computers being denoted as the "Alice computer", and each of the S other sets of computers, respectively, being denoted as an "Eve computer"; (b) the Alice part of the network comprises three or more neural layers; (c) each Eve part, respectively, of the network comprises one or more neural layers; (d) the Bob part of the network comprises two or more neural layers; (e) a first dataset is inputted into the Alice part of the network; (f) forward propagation is performed through the Alice part of the network, then through each of the Eve parts of the network, one Eve part at a time, and then through the Bob part of the network; (g) the Bob computer calculate losses and gradients; (h) backpropagation is performed through the Bob part of the network, then through each of the Eve parts of the network, one Eve part at a time, and then through the Alice part of the network; (i) each Eve computer, respectively, performs forward and back propagation for only one Eve part of the network; and (j) neither Bob nor any of the Eves have access to the first dataset. In some cases, the Bob computer does not have access to information that identifies any computer in the Alice computer. Each of the cases described above in this paragraph is an example of the method described in the first sentence of this paragraph, and is also an example of an embodiment of this invention that may be combined with other embodiments of this invention.

Each description above of any method or apparatus of this invention describes a non-limiting example of this invention. This invention is not limited to those examples, and may be implemented in other ways.

Each description above of any implementation, embodiment or case of this invention (or any use scenario for this invention) describes a non-limiting example of this invention. This invention is not limited to those examples, and may be implemented in other ways.

Each Figure that illustrates any feature of this invention shows a non-limiting example of this invention. This invention is not limited to those examples, and may be implemented in other ways.

The Provisional Application does not limit the scope of this invention. The Provisional Application describes non-limiting examples of this invention, which examples are in addition to—and not in limitation of—the implementations of this invention that are described in the main part of this document. For example, if any given feature described in the Provisional Application is different from, or in addition to, the features described in the main part of this document, this additional or different feature of the Provisional Application does not limit any implementation of this invention described in the main part of this document, but instead merely describes another example of this invention. As used herein, the "main part of this document" means this entire document (including any drawings listed in the Brief Description of Drawings above and any software file listed in the Computer Program Listing section above)), except that the "main part of this document" does not include any document that is incorporated by reference herein.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described or incorporated by reference herein.

What is claimed is:

1. A method of training a neural network, partially on a first set of one or more computers and partially on a second set of one or more computers, wherein:
   (a) the network comprises a first part and a second part, the first and second parts of the network being denoted in this claim as the "Bob part" and "Alice part", respectively, and the first and second sets of computers being denoted in this claim as the "Bob computer" and "Alice computer", respectively;
   (b) the Alice part of the network comprises three or more neural layers;
   (c) the Bob part of the network comprises two or more neural layers;
   (d) a first dataset is inputted into an input layer of the Alice part of the network;
   (e) the Alice computer performs forward propagation through the Alice part of the network;
   (f) output activations of an output layer of the Alice part of the network are sent to the Bob computer and are inputted into an input layer of the Bob part of the network;
   (g) the Bob computer performs forward propagation through the Bob part of the network;
   (h) the Bob computer calculate losses and gradients;
   (i) the Bob computer performs backpropagation through the Bob part of the network;
   (j) gradients of the input layer of the Bob part of the network are sent to the Alice computer;
   (k) the Alice computer performs backpropagation through the Alice part of the network; and
   (l) the Bob computer does not have access to the first dataset.

2. The method of claim 1, wherein, for one or more layers of the Bob part of the network, the Alice computer does not have access to any data that specifies topology of the one or more layers.

3. The method of claim 1, wherein the Alice computer does not have access to data that specifies any hyperparameter of the network that is in the group of hyperparameters consisting of learning rate, learning rate decay, weight decay, and momentum.

4. The method of claim 1, wherein:
   (a) an ensemble includes the neural network of claim 1 and also includes one or more additional neural networks;
   (b) for each respective additional network in the ensemble,
      (i) the respective network comprises a first portion and a second portion, the first and second portions of the respective network being denoted in this claim as the "Bob portion" and "Alice portion", respectively,
      (ii) the Alice portion of the respective network comprises three or more neural layers,
      (iii) the Bob portion of the respective network comprises two or more neural layers,
      (iv) the first dataset is inputted into an input layer of the Alice portion of the respective network,
      (v) the Alice computer performs forward propagation through the Alice portion of the respective network,
      (vi) output activations of an output layer of the Alice portion of the respective network are sent to the Bob computer and inputted into an input layer of the Bob portion of the respective network,
      (vii) the Bob computer performs forward propagation through the Bob portion of the respective network,
      (viii) the Bob computer calculates losses and gradients,
      (ix) the Bob computer performs backpropagation through the Bob portion of the respective network,
      (x) gradients of the input layer of the Bob portion of the respective network are sent to the Alice computer, and
      (xi) the Alice computer performs backpropagation through the Alice portion of the respective network; and
   (c) during test mode, each network in the ensemble, respectively, outputs a classification, such that the networks in the ensemble collectively output a set of classifications;
   (d) based on the set of classifications, a classification is determined according to a voting function; and
   (e) none of the networks in the ensemble is identical to any other network in the ensemble.

5. The method of claim 1, wherein:
(a) during test mode after the network is trained, the network takes, as input, a second dataset and outputs labels regarding the second dataset;
(b) the labels are shared with an additional set of one or more computers;
(c) the additional set of computers performs forward and back propagation in a second network while training the second network;
(d) the additional set of computers trains the second network on the second dataset, by a training that includes employing the labels that were shared;
(e) the additional set of computers does not have access to the first dataset; and
(f) the first dataset is not identical to the second dataset.

6. The method of claim 5, wherein:
(a) the network mentioned in claim 1 has a first topology;
(b) the second network has a second topology; and
(c) the first topology is different than the second topology.

7. A method of training a neural network, partially on a first set of one or more computers and partially on other sets of one or more computers each, wherein:
(a) the network comprises a first part and a second part, the first and second parts of the network being denoted in this claim as the "Bob part" and "Alice part", respectively, the first set of computers being denoted in this claim as the "Bob computer", and each of the other sets of computers, respectively, being denoted in this claim as an "Alice computer";
(b) the Alice part of the network comprises three or more neural layers;
(c) the Bob part of the network comprises two or more neural layers;
(d) for each respective Alice computer
  (i) a dataset is inputted by the respective Alice computer into an input layer of the Alice part of the network;
  (ii) the respective Alice computer performs forward propagation through the Alice part of the network;
  (iii) output activations of an output layer of the Alice part of the network are sent to the Bob computer and inputted into an input layer of the Bob part of the network;
  (iv) the Bob computer performs forward propagation through the Bob part of the network;
  (v) the Bob computer calculates losses and gradients;
  (vi) the Bob computer performs backpropagation through the Bob part of the network;
  (vii) gradients of the input layer of the Bob part of the network are sent to the respective Alice computer, and
  (viii) the respective Alice computer performs backpropagation through the Alice part of the network; and
(e) the Bob computer has access to no database inputted in clause (d)(i) of this claim.

8. The method of claim 7, wherein, for one or more layers of the Bob part of the network, none of the Alice computers have access to any data that specifies topology of the one or more layers.

9. The method of claim 7, wherein, for a set of hyperparameters of the network, none of the Alice computers have access to data that specifies any hyperparameter of the network that is in the group of hyperparameters consisting of learning rate, learning rate decay, weight decay, and momentum.

10. The method of claim 7, wherein each Alice computer has access to no database inputted in clause (d)(i) of claim 7 by any other Alice computer.

11. The method of claim 7, wherein, after a first Alice computer performs steps (d)(ii) and (d)(viii) of claim 7:
(a) the first Alice computer uploads encrypted weights of the Alice part of the network to a server; and
(b) a second Alice computer downloads the encrypted weights from the server.

12. The method of claim 7, wherein:
(a) after a first Alice computer performs steps (d)(ii) and (d)(viii) of claim 7
  (i) the first Alice computer uploads encrypted weight updates for the Alice part of the network to a server, and
  (ii) a second Alice computer downloads the encrypted weight updates from the server; and
(b) each weight update, respectively, denotes a change in a given weight from an earlier value of the given weight.

13. The method of claim 12, wherein the server is a computer in the Bob computer.

14. The method of claim 13, wherein the server is a computer in an Alice computer.

15. The method of claim 7, wherein, after a first Alice computer performs steps (d)(ii) and (d)(viii) of claim 7:
(a) the Bob computer sends to the first Alice computer data that identifies a second Alice computer, or sends to the second Alice computer data that identifies the first Alice computer; and
(b) the first Alice computer sends weights for the Alice part of the network to the second Alice computer.

16. The method of claim 7, wherein:
(a) after a first Alice computer performs steps (d)(ii) and (d)(viii) of claim 7
  (i) the Bob computer sends to the first Alice computer data that identifies a second Alice computer, or sends to the second Alice computer data that identifies the first Alice computer, and
  (ii) the first Alice computer sends weight updates for the Alice part of the network to the second Alice computer; and
(b) each weight update, respectively, denotes a change in a given weight from an earlier value of the given weight.

17. A method of training a neural network, partially on a first set of one or more computers and partially on other sets of one or more computers each, wherein:
(a) the network comprises a first part and a second part, the first and second parts of the network being denoted in this claim as the "Bob part" and "Alice part", respectively, the first set of computers being denoted in this claim as the "Bob computer", and each of the other sets of computers, respectively, being denoted in this claim as an "Alice computer";
(b) the Alice part of the network comprises an encoder and a decoder;
(c) the Bob part of the network comprises two or more neural layers;
(d) for each respective Alice computer
  (i) a dataset is inputted by the respective Alice computer into an input layer of the Alice part of the network;
  (ii) the respective Alice computer performs forward propagation through the Alice part of the network;

(iii) output activations of an output layer of the Alice part of the network are sent to the Bob computer and inputted into an input layer of the Bob part of the network;

(iv) the Bob computer performs forward propagation through the Bob part of the network;

(v) the Bob computer calculates losses and gradients;

(vi) the Bob computer performs backpropagation through the Bob part of the network;

(vii) gradients of the input layer of the Bob part of the network are sent to the respective Alice computer, and (viii) the respective Alice computer combines gradients from the decoder and gradients from the Bob part of the network, and performs backpropagation in the Alice part of the network; and (e) the Bob computer has access to no database inputted in clause (d)(i) of this claim.

18. The method of claim 17, wherein, for one or more layers of the Bob part of the network, none of the Alice computers have access to any data that specifies topology of the one or more layers.

19. A method of training a neural network, partially on a first set of one or more computers, partially on a second set of one or more computers, and partially on S other sets of one or more computers each, S being the number of other sets, wherein:

(a) the network comprises a first part, a second part, and S other parts, the first part being denoted in this claim as the "Bob part", the second part being denoted in this claim as the "Alice part", and each of the S other parts, respectively, being denoted in this claim as an "Eve part", the first set of computers being denoted in this claim as the "Bob computer", the second set of computers being denoted in this claim as the "Alice computer", and each of the S other sets of computers, respectively, being denoted in this claim as an "Eve computer";

(b) the Alice part of the network comprises three or more neural layers;

(c) each Eve part, respectively, of the network comprises one or more neural layers;

(d) the Bob part of the network comprises two or more neural layers;

(e) a first dataset is inputted into the Alice part of the network;

(f) forward propagation is performed through the Alice part of the network, then through each of the Eve parts of the network, one Eve part at a time, and then through the Bob part of the network;

(g) the Bob computer calculate losses and gradients;

(h) backpropagation is performed through the Bob part of the network, then through each of the Eve parts of the network, one Eve part at a time, and then through the Alice part of the network;

(i) each Eve computer, respectively, performs forward and back propagation for only one Eve part of the network; and (j) neither Bob nor any of the Eves have access to the first dataset.

20. The method of claim 10, wherein the Bob computer does not have access to information that identifies any computer in the Alice computer.

* * * * *